United States Patent
Lee et al.

(10) Patent No.: US 12,302,238 B2
(45) Date of Patent: *May 13, 2025

(54) NETWORK SLICE-AVAILABLE AREA INFORMATION ACQUISITION METHOD

(71) Applicant: Samsung Electronics Co., Ltd., Suwon-si (KR)

(72) Inventors: Hoyeon Lee, Seoul (KR); Sunghoon Kim, Seoul (KR); Youngkyo Baek, Seoul (KR); Jungje Son, Yongin-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,886

(22) Filed: Oct. 16, 2023

(65) Prior Publication Data

US 2024/0049125 A1 Feb. 8, 2024

Related U.S. Application Data

(63) Continuation of application No. 17/660,580, filed on Apr. 25, 2022, now Pat. No. 11,792,730, which is a
(Continued)

(30) Foreign Application Priority Data

Apr. 27, 2017 (KR) .................. 10-2017-0054642
Jul. 25, 2017 (KR) .................. 10-2017-0094177

(51) Int. Cl.
*H04W 48/18* (2009.01)
*H04W 4/70* (2018.01)
(Continued)

(52) U.S. Cl.
CPC ............. *H04W 48/18* (2013.01); *H04W 4/70* (2018.02); *H04W 8/02* (2013.01); *H04W 16/02* (2013.01);
(Continued)

(58) Field of Classification Search
CPC ....... H04W 48/18; H04W 4/70; H04W 76/28; H04W 8/02
See application file for complete search history.

(56) References Cited

U.S. PATENT DOCUMENTS 11,317,344 B2 * 4/2022 Lee ..................... H04W 68/02
2014/0086342 A1 3/2014 Wang
(Continued)

FOREIGN PATENT DOCUMENTS

CN 105472548 A 7/2010
CN 106375987 A 3/2017
(Continued)

OTHER PUBLICATIONS

Nokia, et al., "On Network Function Selection in Network Slicing environment," S2-172231, SA WG2 Meeting #120, Mar. 27-31, 2017, 3 pages.
(Continued)

*Primary Examiner* — Kevin M Cunningham

(57) ABSTRACT

A communication scheme and system converges a 5G communication system supporting a data rate higher than that of a 4G system with an internet of things (IoT) technology. Applicable to intelligent services (e.g., smart homes, smart buildings, smart cities, smart cars, connected cars, health care, digital education, retails, and security and safety-related services), the communication scheme and system is based on the 5G communication technology and the IoT-related technology. Methods of operation a terminal and a
(Continued)

network for facilitating a 5G terminal registration procedure in a wireless communication system are disclosed.

10 Claims, 17 Drawing Sheets

Related U.S. Application Data continuation of application No. 16/820,494, filed on Mar. 16, 2020, now Pat. No. 11,317,344, which is a continuation of application No. 15/965,314, filed on Apr. 27, 2018, now Pat. No. 10,595,268.

(51) Int. Cl.
| | |
|---|---|
| *H04W 8/02* | (2009.01) |
| *H04W 16/02* | (2009.01) |
| *H04W 68/02* | (2009.01) |
| *H04W 76/28* | (2018.01) |
| *H04W 4/02* | (2018.01) |
| *H04W 8/06* | (2009.01) |
| *H04W 60/04* | (2009.01) |

(52) U.S. Cl.
CPC ......... *H04W 68/02* (2013.01); *H04W 76/28* (2018.02); *H04W 4/02* (2013.01); *H04W 8/065* (2013.01); *H04W 60/04* (2013.01)

(56) References Cited

U.S. PATENT DOCUMENTS

| | | |
|---|---|---|
| 2016/0255667 A1 | 9/2016 | Schwartz |
| 2017/0303259 A1 | 10/2017 | Lee et al. |
| 2018/0206152 A1 | 7/2018 | Zhang et al. |
| 2018/0227743 A1 | 8/2018 | Faccin et al. |
| 2018/0279400 A1 | 9/2018 | Faccin et al. |
| 2019/0021047 A1 | 1/2019 | Zong |
| 2019/0098618 A1 | 3/2019 | Lee et al. |
| 2020/0015066 A1 | 1/2020 | Zhu |
| 2020/0015158 A1 | 1/2020 | So |

FOREIGN PATENT DOCUMENTS

| | | |
|---|---|---|
| CN | 113411784 B | 1/2022 |
| WO | 2017004378 A1 | 1/2017 |
| WO | 2017045644 A1 | 3/2017 |
| WO | 2017058067 A1 | 4/2017 |

OTHER PUBLICATIONS

Telecom Italia, et al., "Network Slice Repository Function (NSRF)," S2-171744, SA WG2 Meeting #120, Mar. 27-31, 2017, 17 pages.
Huawei, et al., "TS 23.501: Update to Network Slice Selection Parameters," S2-172064, SA WG2 Meeting #120, Mar. 27-31, 2017, 3 pages.
HTC, "Correction to the NSSAI based AMF selection procedure," S2-171847, SA WG2 Meeting #120, Mar. 27-31, 2017, 4 pages.
Ericsson, "Signalling aspects of network slicing," R2-1702551, 3GPP TSG-RAN WG2 #97bis, Apr. 3-7, 2017, 7 pages.
International Search Report dated Aug. 10, 2018 in connection with International Patent Application No. PCT/KR2018/004894, 3 pages.
Supplementary European Search Report dated Nov. 25, 2020 in connection with European Application No. 18789992.7, 11 pages.
NTT DOCOMO, et al., "Position of Network Slice Selection Function (NSSF) in overall architecture," S2-171932, SA WG2 Meeting #120, Busan, South Korea, Mar. 27-31, 9 pages.
Qualcomm Incorporated et al., "TS 23.501: Updates to network slicing description," S2-172406, SA WG2 Meeting #S2-120, Busan, South Korea, Mar. 27-31, 7 pages.
ZTE, "Update of solution 8.5," S3-170609 revision of S3-170073, 3GPP TSG SA WG3 (Security) Meeting #86bis, Busan, South Korea, Mar. 27-31, 2017, 5 pages.
Notification of Fulfilling of Registration Formality dated Nov. 5, 2021, in connection with the Chinese Application No. 202110576243. X, 10 pages.
Cao Jinjun, "Research on Information Aggregation Based on Web Slice," Information studies: Theory & Application, 2013, 6 pages.
Ericsson, "23.501: Network Slice Selection enhancements," S2-171784 (revision of S2-17xxx), SA WG2 Meeting #120, Busan, Korea, Mar. 27-31, 2017, 6 pages.
Huawei, et al., "TS 23.502 : Updated Registration Procedure and Network Slice Selection," S2-172065, SA WG2 Meeting #120, Busan, South Korea, Mar. 27-31, 2017, 6 pages.
Huawei, et al., "TS 23.502: Clarifications on Registration, PDU Session Establishment procedures and Network Slicing," S2-171509 (revision of S2-171038), 3GPP TSG SA WG2 Meeting #119, Dubrovnik, Croatia, Feb. 13-17, 2017, 6 pages.
Nokia, "On providing Accepted NSSAI to the Ran," S2-170778 (was S2-170347), SA WG2 Meeting #119, Dubrovnik, Croatia, Feb. 13-17, 2017, 6 pages.
NTT DOCOMO, et al., "Position of NSSF function in overall architecture," S2-171933 (revision of S2-17xxxx), SA WG2 Meeting #120, Busan, South Korea, Mar. 27-31, 2017, 2 pages.
Qualcomm Incorporated, et al., "TS 23.501: Updates to network slicing description," S2-172787, SA WG2 Meeting #S2-120, Busan, South Korea, Mar. 27-31, 2017, 7 pages.
ZTE, et al., "Proposed alignments of Network Slicing Conclusion with 5G Core Overall Architecture," S2-170168 (revision of S2-17xxxx), SA WG2 Meeting #118bis, Spokane, WA, USA, Jan. 16-20, 2017, 8 pages.
ZTE, et al., "Proposed architecture alignments of Network Slicing Conclusion with 5G Core Overall Architecture in TS 23.501," S2-171027 (revision of S2-17xxxx), SA WG2 Meeting #119, Dubrovnik, Croatia, Feb. 13-17, 2017, 7 pages.
ZTE, et al., "TS 23.501: Updates to network slicing description to support NSRF," S2-172112, SA WG2 Meeting #S2-120, Busan, South Korea, Mar. 27-31, 2017, 10 pages.
Xi, et al., "Patent analysis of network slicing technology," Telecommunications Network Technology, No. 3, 2017, 7 pages.
The First Office Action dated Jan. 30, 2022, in connection with Chinese Application No. 201880027727.5, 20 pages.
Nokia, et al., "On providing Allowed NSSAI to the RAN in Registration Procedure," S2-172240, SA WG2 Meeting #119, Dubrovnik, Croatia, Feb. 13-17, 2017, 7 pages.
Xu Yang, et al., "Initial Analysis of 5G Mobile Network Slicing Technology," Monthly Focus, DTPT, Jun. 2016, 4 pages. (English abstract).
Office Action dated Jul. 18, 2022 in connection with Chinese Patent Application No. 201880027727.5, 12 pages.
Decision of Patent dated Oct. 25, 2022, in connection with Korean Application No. 10-2018-0048882, 5 pages.
Office Action issued Jun. 7, 2023, in connection with Korean Patent Application No. 10-2023-0009536, 11 pages.
Decision of Rejection dated Dec. 15, 2023, in connection with Korean Patent Application No. 10-2023-0009536, 7 pages.

\* cited by examiner

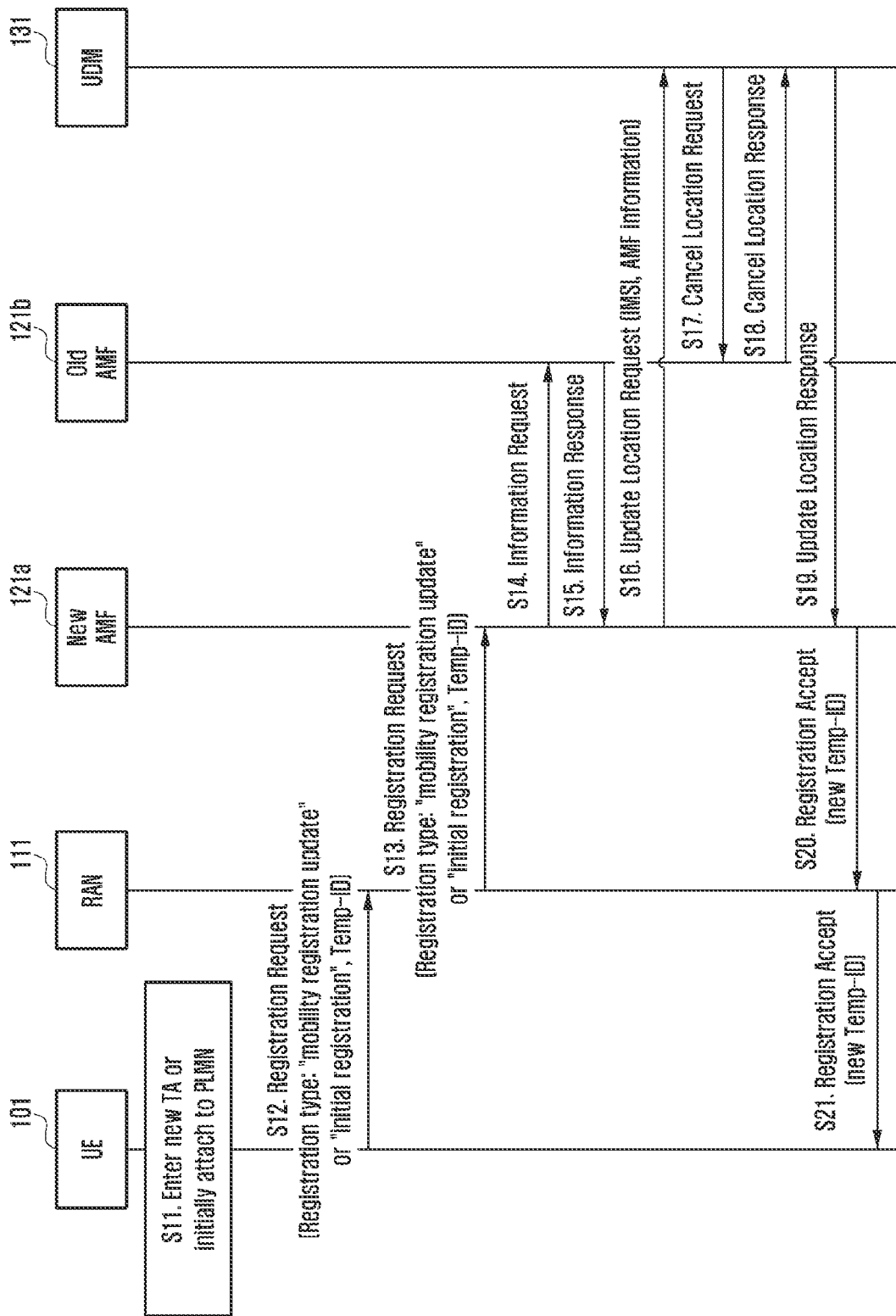

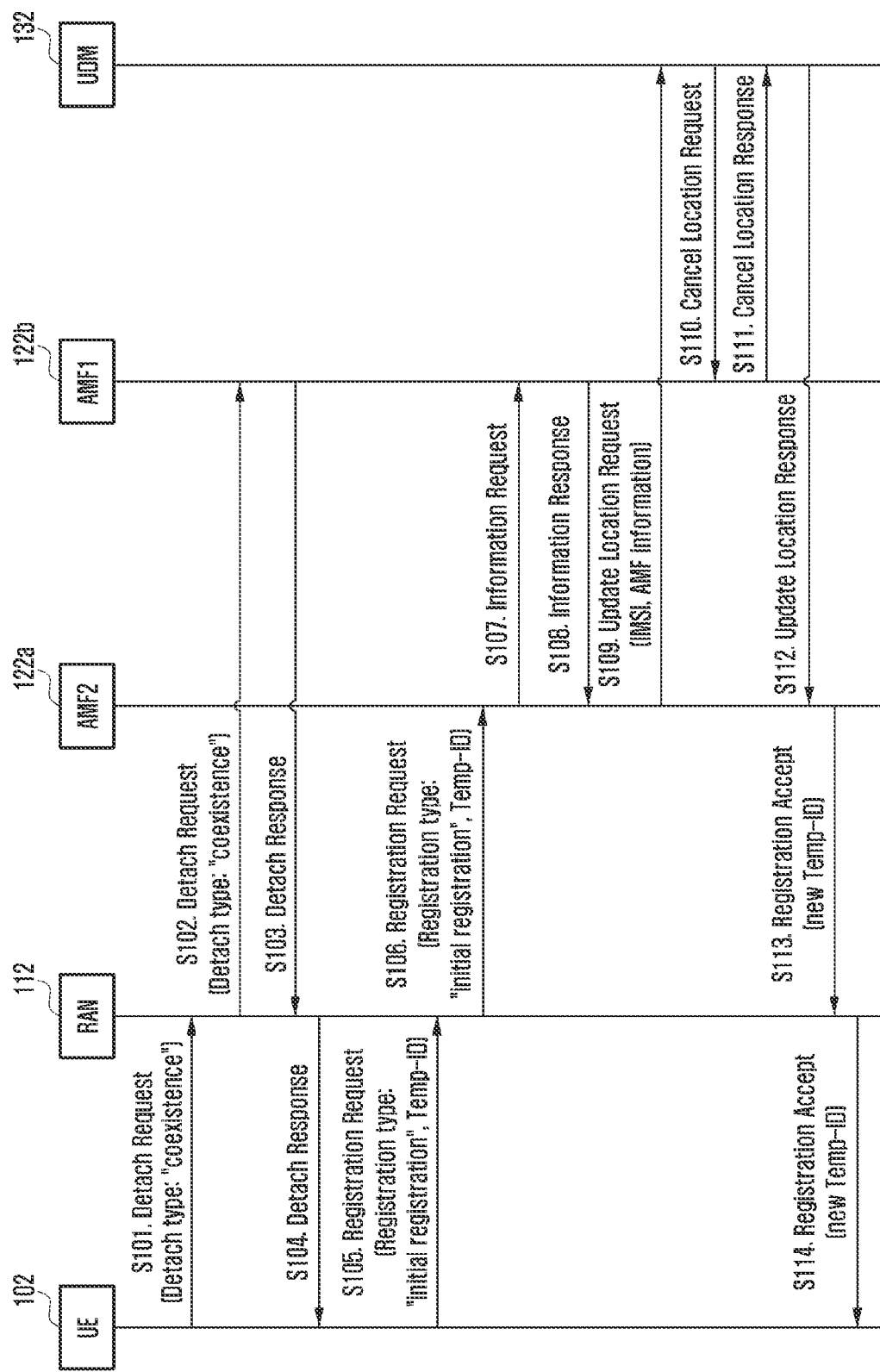

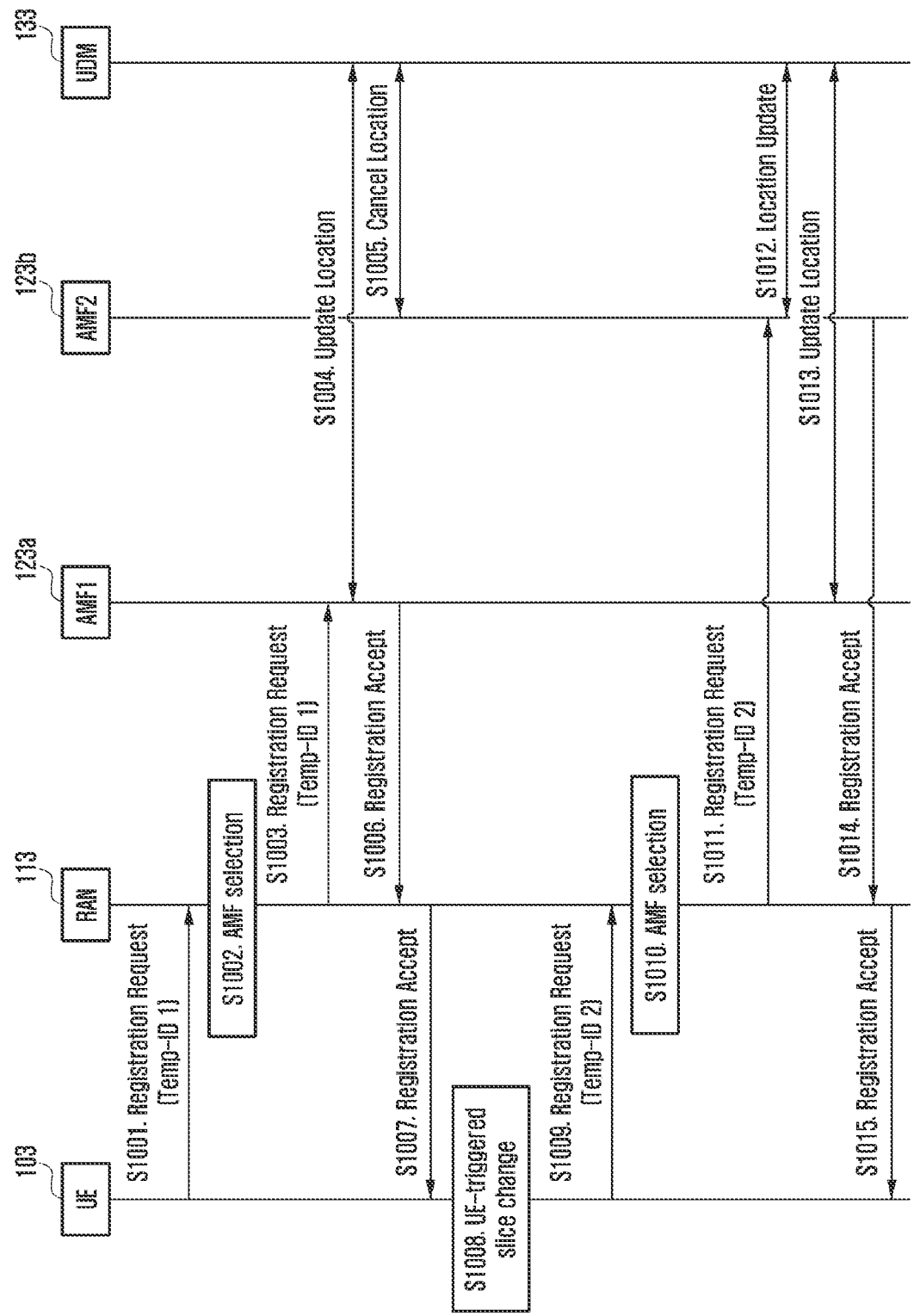

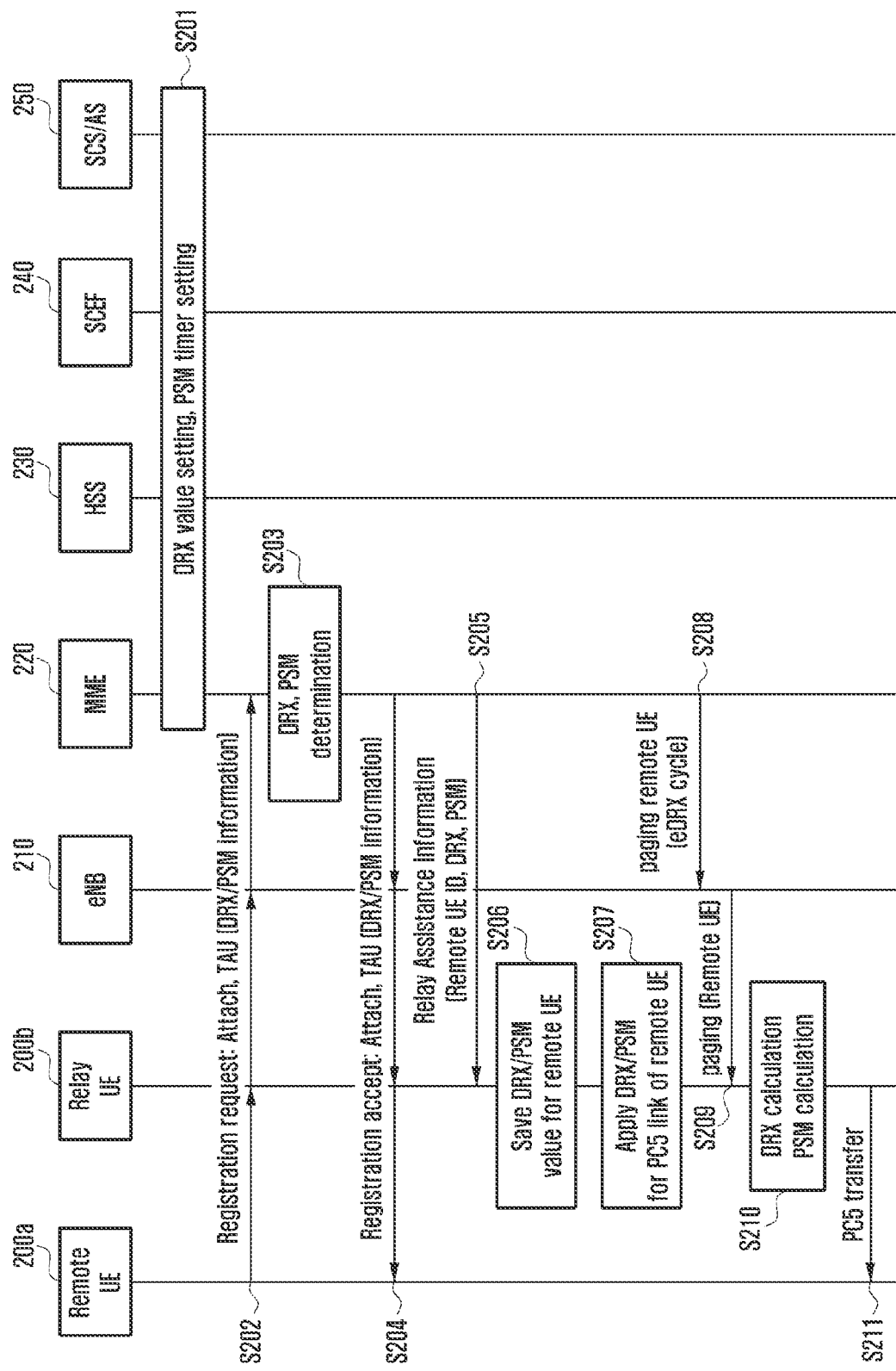

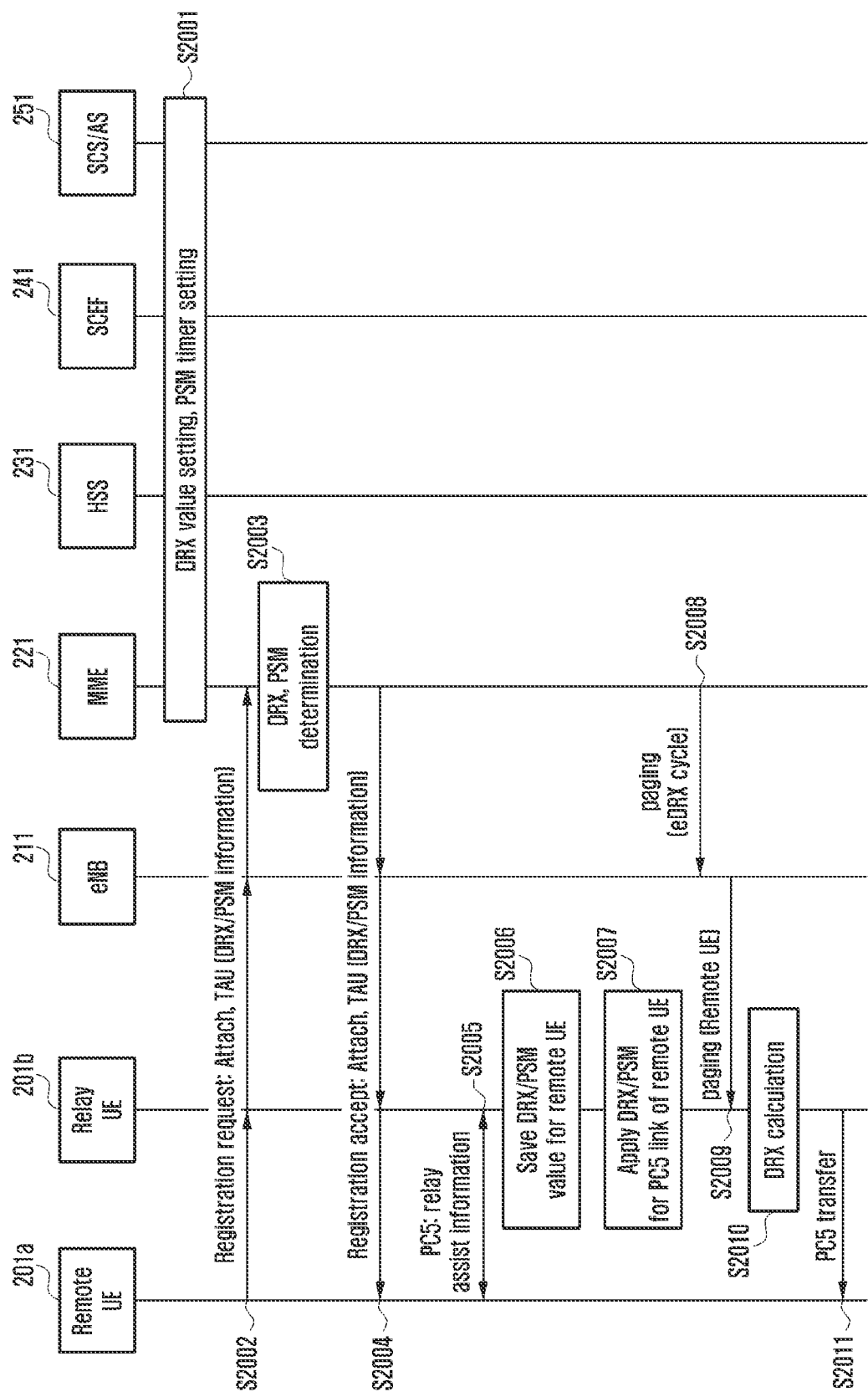

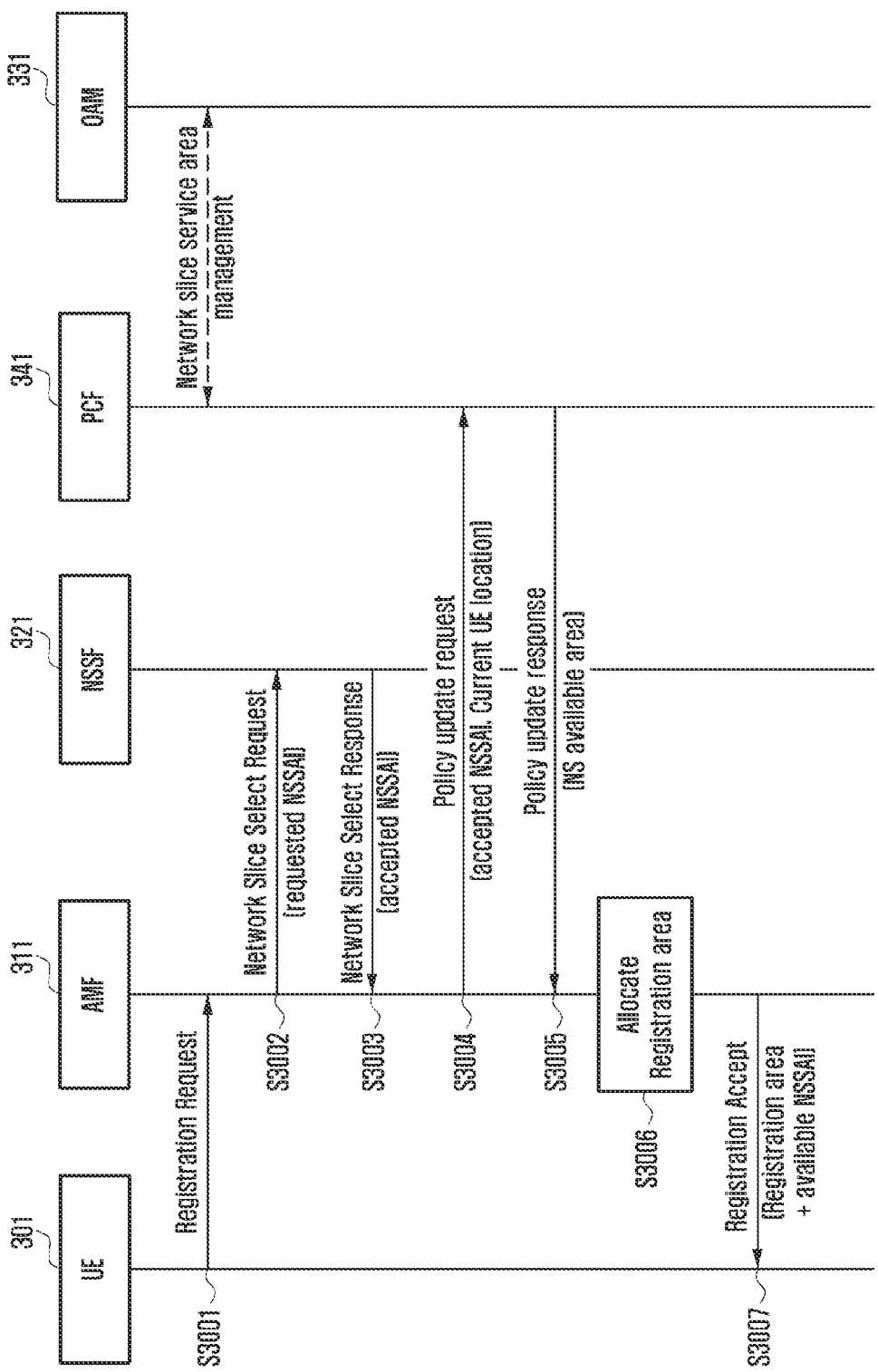

NETWORK SLICE-AVAILABLE AREA INFORMATION ACQUISITION METHOD

CROSS-REFERENCE TO RELATED APPLICATIONS

This application is a continuation of U.S. Non-Provisional Application Ser. No. 17/660,580 filed Apr. 25, 2022, now U.S. Pat. No. 11,792,730, which is a continuation of U.S. Non-Provisional application Ser. No. 16/820,494 filed Mar. 16, 2020, now U.S. Pat. No. 11,317,344, which is a continuation of U.S. Non-Provisional patent application Ser. No. 15/965,314 filed Apr. 27, 2018, now U.S. Pat. No. 10,595,268, which claims priority under 35 U.S.C. § 119 to Korean Patent Application No. 10-2017-0054642 filed Apr. 27, 2017 and Korean Patent Application No. 10-2017-0094177 filed Jul. 25, 2017 in the Korean Intellectual Property Office, the disclosures of which are incorporated herein by reference in their entireties.

BACKGROUND

1. Field

The present disclosure relates to operation methods by a terminal and a network for facilitating a $5^{th}$ generation (5G) terminal registration procedure in a wireless communication system.

2. Description of Related Art

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system. Implementation of the 5G communication system in millimeter wave (mmWave) frequency bands—e.g., 60 giga-Hertz (GHz) bands—is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna.

Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM) {FQAM} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based big data processing technology and the Internet of Things (IoT) begets Internet of Everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies.

In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

With the evolution of wireless communication systems, there is a need of a method and apparatus for facilitating a 5G terminal registration procedure.

SUMMARY

The present disclosure aims to provide operation methods of a terminal and a network for facilitating a 5G terminal registration procedure.

Also, the present disclosure aims to provide an operation method of a release-15 relay, i.e., Layer-2 Relay. A remote user equipment (UE) connects to a core network via a relay UE and a base station to use a mobile communication service. The reason why the remote UE connects to a 3rd Generation Partnership Project (3GPP) network via a relay UE rather than directly is that it is advantageous for a UE located at a cell edge where the signal strength from the base station is weak to perform communication via a neighboring UE rather than directly with the base station in view of signal transmit and receive powers.

Meanwhile, the 4G and 5G systems provide a UE with some functions for saving power consumption of the UE. For example, it may be possible to configure a long discontinuous reception (DRX) cycle for a UE in an idle state and a timer for securing data transmission and reception time before the UE enters a power saving mode and thus become unreachable. Such functions, called extended DRX (eDRX) and power saving mode (PSM), may be referred to by different names.

Such low power functions have been applied to normal UEs, but they have not been applied to the UEs operating on a device-to-device (D2D) link (or PC5 link). However, since a remote UE communicates with the relay UE over a D2D link to connect to the core network for use of a service, it may be necessary for the remote UE to use a low power function too. For example, it may be possible to expect a power saving effect by applying the eDRX or PSM timer designed for use in the core network to the D2D link. In this respect, the present disclosure proposes a method for applying the low power technique designed for use between a UE and a base station and between a UE and a core network to a remote UE that uses the D2D relay service.

The present disclosure is characterized in that an access and mobility management function (AMF) sends a query to a network slice selection function (NSSF) to acquire network slice information indicative of network slices available for a UE in reply in order to select a network slice to be assigned to the UE for 5G mobile communication services defined by 3GPP. However, the areas available for use of a network slice may vary depending on characteristics of the network slice. Accordingly, the AMF has to acquire and manage the information on the areas available for use of the corresponding network slice as well as the information on the network slice available for use by the UE. Also, the present disclosure proposes a method for an AMF to acquire information on areas available for use of a network slice.

In accordance with an aspect of the present disclosure, a method by an access and mobility management function (AMF) in a wireless communication system is provided. The method includes transmitting a first message including at least one network slice selection assistance information (NSSAI) requested by a terminal to a network slice function (NSSF) and receiving, in response to the first message, a second message including allowed NSSAI for the terminal and information on an area capable of being served by at least one network slice corresponding to the allowed NSSAI from the NSSF.

In accordance with another aspect of the present disclosure, a method by a network slice selection function (NSSF) in a wireless communication system is provided. The method includes receiving a first message including at least one network slice selection assistance information (NSSAI) requested by a terminal from an access and mobility management function (AMF), determining allowed NSSAI for the terminal and information on area capable of being served by at least one network slice corresponding to the allowed NSSAI, and transmitting a second message including the allowed NSSAI and the information on the area to the AMF.

In accordance with another aspect of the present disclosure, an access and mobility management function (AMF) entity in a wireless communication system is provided. The entity includes a transceiver and a controller configured to control the transceiver to transmit a first message including at least one network slice selection assistance information (NSSAI) requested by a terminal to a network slice function (NSSF) and receive, in response to the first message, a second message including allowed NSSAI for the terminal and information on an area capable of being served by at least one network slice corresponding to the allowed NS SAI from the NSSF.

In accordance with still another aspect of the present disclosure, a network slice selection function (NSSF) entity by a wireless communication system is provided. The entity includes a transceiver and a controller configured to control the transceiver to receive a first message including at least one network slice selection assistance information (NSSAI) requested by a terminal from an access and mobility management function (AMF), determine allowed NSSAI for the terminal and information on area capable of being served by at least one network slice corresponding to the allowed NSSAI, and control the transceiver to transmit a second message including the allowed NSSAI and the information on the area to the AMF.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1B is a signal flow diagram illustrating a new Temp-ID allocation procedure according to an embodiment of the present disclosure;

FIG. 1C is a signal flow diagram illustrating a detach procedure according to an embodiment of the present disclosure;

FIG. 1D is a signal flow diagram illustrating a TAU procedure according to an embodiment of the present disclosure;

FIG. 2A is a signal flow diagram illustrating a procedure for a core network (CN) entity to provide a relay UE of low power function information for use by the relay UE in establishing a PC5 link;

FIG. 2B is a signal flow diagram illustrating a procedure by which a remote UE sends low power function information received from a CN entity to a relay UE through a PC5 link in order for the relay UE to apply the information to the PC5 link;

FIG. 3B is a signal flow diagram illustrating a procedure for an AMF to acquire information on an area capable of being served by network slices from a PCF according to an embodiment of the present disclosure;

DETAILED DESCRIPTION

Figure 1A:
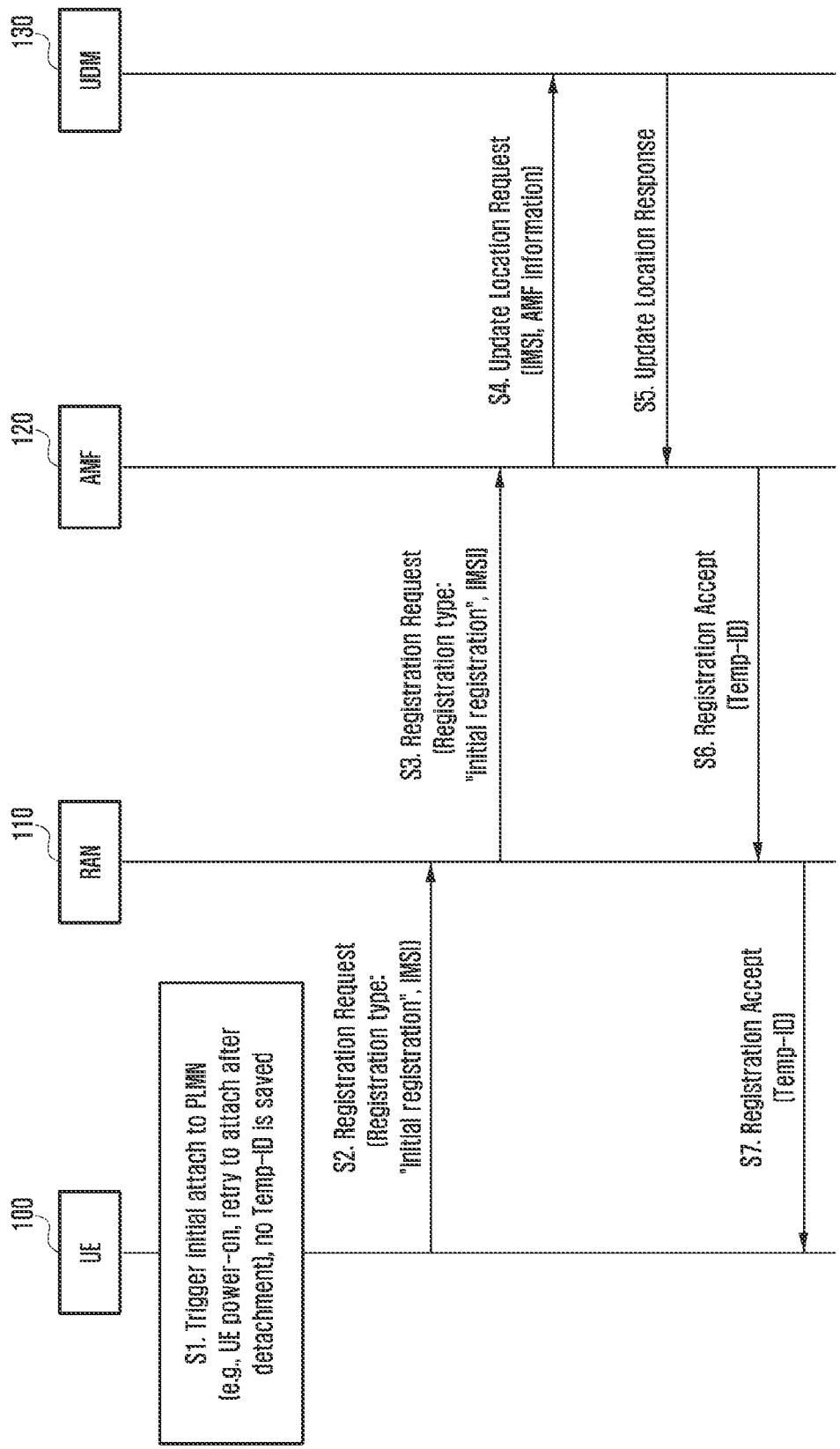
FIG. 1A is a signal flow diagram illustrating an initial registration procedure without Temp-ID according to an embodiment of the present disclosure.

FIGS. 1A through 3E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure are described in detail with reference to the accompanying drawings. For well-known functions and structures incorporated herein, detailed descriptions may be omitted to avoid obscuring the subject matter of the present disclosure. Further, terms are defined herein in consideration of the functionality in the present disclosure, and they may vary according to the intention of a user or an operator, usage, etc. Therefore, the definition should be made on the basis of the overall content of the present specification.

Advantages and features of the present disclosure and methods of accomplishing the same may be understood more readily by reference to the following detailed description of various embodiments and the accompanying drawings. The present disclosure may, however, be embodied in many different forms and should not be construed as being limited to the various embodiments set forth herein. Rather, these various embodiments are provided so that this disclosure will be thorough and complete and will fully convey the concept of the disclosure to those skilled in the art, and the present disclosure will only be defined by the appended claims. Like reference numerals refer to like elements throughout the specification.

Although the description is directed to the communication standards specified by the 3GPP, it will be understood by those skilled in the art that the present disclosure can be applied even to other communication systems having a similar technical background and channel format, with a slight modification, without departing from the spirit and scope of the present disclosure.

In the following description, the terms "slice," "service," "network slice," "network service," "application slice," and "application service" may be interchangeably used.

If a predetermined condition is fulfilled, a UE initiates a registration procedure by sending a Registration Request message to an AMF of a 5G CN. In reference to FIG. 1A, initial attachment of the UE 100 to a public land mobile network (PLMN) may be triggered by power-on of the UE 100 or necessity of reattachment to the CN after being detached. In this case, the UE 100 may have not Temp-ID at step S1.

The UE 100 sends a radio access network (RAN) 110 a Registration Request message with a registration type set to "initial registration." If there is neither security-related information nor UE Temp-ID acquired in a previous registration procedure, the UE 100 sends the Registration Request message including an international mobile subscriber identity (IMSI) as a persistent ID of the UE at step S2.

The RAN 110 sends the Registration Request message received from the UE 100 to the AMF 120 at step S3.

Upon receipt of the Registration Request message, the AMF 120 sends, at step S4, user data management (UDM) 130 the information on the AMF 120 to which the UE 100 has the current connection. That is, the AMF 120 sends the UDM 130 an Update Location Request message including the IMSI of the UE 100 and AMF information for use in identifying the AMF to which the UE 100 has the current connection at step S4. The AMF information may include an AMF ID or an AMF group ID for identifying the AMF group to which the AMF belongs.

The AMF 120 updates current location information of the UE 100 based on an Update Location Response message received at step S5 from the UDM 130, assigns a Temp-ID to the UE 100, and sends, at step S6, the RAN 110 a Registration Accept message including the Temp-ID. Here, the Temp-ID may be assigned before updating the location information.

Upon receipt of the Registration Accept message, the RAN 110 sends the UE 100 the Registration Accept message at step S7 such that the UE 100 uses the Temp-ID included in the Registration Accept message as the UE ID when transmitting afterward a message to the 5G RAN/CN. That is, the UE 100 uses the Temp-ID instead of its IMSI.

FIG. 1B shows a procedure of updating a Temp-ID assigned to a UE in a previous registration procedure with a new Temp-ID.

In reference to FIG. 1B, the UE 101 may move out of a registration area (TAI list) (enter a new tracking area (TA)) or attempt initial access to a PLMN at step S11. The UE 101 may perform the operation as shown in FIG. 1B when the UE has the previously assigned Temp-ID.

At step S12, the UE 101 may send a RAN 111 a Registration Request message including a registration type set to "mobility registration update" or "initial registration" and the Temp-ID. In this case, the RAN 111 sends the Registration Request message to a new AMF 121*a* at step S13 and retrieves information on an old AMF 121*b* to which the UE 101 has previously attached based on the UE's Temp-ID included in the Registration Request message.

The new AMF 121a requests to an old AMF 121b for UE information at step S14. The old AMF 121b sends the new AMF 121a the UE information (UE context, MM context, and SM context) at step S15.

The new AMF 121a also request to a UDM 131 for updating UE location with new location information. That is, the new AMF 121a sends, at step S16, the UDM 131 an Update Location Request message including the IMSI of the UE 101 and the AMF information on the AMF to which the UE 101 has access. Here, the AMF information may include an AMF ID and AMF group ID to which the AMF belongs.

Upon receipt of the Update Location Request message, the UDM 131 inspects the IMSI of the UE 101 and determines that location information of AMF which the UE 101 has previously connected to is the old AMF 121b. Then, the UDM 131 sends, at step S17, the old AMF 121b a Cancel Location Request message notifying that the UE 101 has connected to different AMF. Upon receipt of the Cancel Location Request message, the old AMF 121b deletes the stored UE information (UE context, MM context, and SM context) and sends, at step S18, the UDM 131 a Cancel Location Response message notifying that the UE information has been deleted.

After the UE information has been completely deleted in the old AMF 121b, the UDM 131 sends the new AMF 121a an Update Location Response message at step S19. The new AMF 121a may assign a new Temp-ID to the UE 101. The new AMF 121a may send the UE 101 a Registration Accept message including the newly assigned Temp-ID via the RAN 111 through steps S20 and S21.

Upon receipt of the Registration Accept message, the UE 101 replaces the previously stored Temp-ID with the new Temp-ID and uses the new Temp-ID included in the Registration Accept message when transmitting afterward a message to a 5G RAN/CN.

Through the procedure of FIG. 1B, the Temp-ID stored in the UE 101 is replaced by the new Temp-ID, the old AMF 121b that has served the UE 101 deletes the UE information, and the UDM 131 updates the UE location information.

Hereinafter, descriptions are made of the procedure for the UE to maintain multiple Temp-IDs without deleting the old Temp-ID and for the old AMF to maintain the UE information, even when a new Temp-ID is assigned to the UE, and the procedure for the UDM to maintain information on multiple locations of UE.

It may be necessary to define a metric to determine whether to maintain multiple Temp-IDs without deletion of the old Temp-ID. This metric may be determined differently depending on the value of the registration type included in the Registration Request message transmitted by the UE at step S12 of FIG. 1B.

If the registration type is set to "mobility registration update," it may be possible to delete the Temp-ID and replace the old Temp-ID with a new Temp-ID received at step S21 for use as the UE identifier.

If the registration type is set to "initial registration," it may be possible to maintain two Temp-IDs, i.e., the old Temp-ID and the new Temp-ID received as the UE ID at step S21, without deletion of the old Temp-ID. If this determination is repetitively made, the UE may store multiple Temp-IDs.

In the case where multiple Temp-IDs are stored in the UE, each Temp-ID may be stored along with the information on the situation where the respective Temp-ID should be used.

That is, the UE may store the Temp-IDs along with available AMF group information. For example, Temp-ID 1 is used in AMF group A, and Temp-ID 2 is used in AMF group B.

In another approach, the UE may store the Temp-ID along with available network slice information. For example, Temp-ID 1 is used in slice 1, slice 2, and slice 3; Temp-ID 2 is used in slice 1, slice 4, and slice 5; and Temp-ID 3 is used in slice 6.

In another approach, the UE may store the Temp-ID in association with access network type. For example, Temp-ID 1 is used in a 3GPP 5G RAN, and Temp-ID 2 is used in a non-3GPP AN.

There is a need of a metric to determine whether to assign and manage multiple Temp-IDs. This metric may be explained as follows.

The Registration Request message being transmitted by the UE at step S12 of FIG. 1B may include an indicator indicating that the UE wants to be assigned a new Temp-ID while maintaining the old Temp-ID (indicator set to "coexistence"). For example, a UE with a network slice function may have the information on the slices that can serve the UE simultaneously and the slices that can serve the UE separately. For example, it may be possible that an AMF supports slice 1, slice 2, and slice 3 while another AMF supports slice 6. If a UE being served by slice 1, slice 2, and slice 3 with a Temp-ID assigned by the AMF supporting slices 1 to 3 wants to be served by slice 6, the UE sends a Registration Request message as at step S12. In this case, the Registration Request message being transmitted by the UE includes the indicator set to "coexistence."

Upon receipt of the Registration Request message including the indicator, the new AMF sends, as at step S16, the UDM an Update Location Request message including the indicator set to "coexistence."

Upon receipt of the Update Location Request message, the UDM may operate in two manners to maintain the UE context in the old AMF.

First, it may be possible to skip performing the cancel location process of steps S17 and S18.

Second, it may be possible for the UDM to send the old AMF a Cancel Location Request message including the indicator set to "coexistence" at step S17. Upon receipt of the Cancel Location Request message, the old AMF notices that the UE has connected to the new AMF and sends, at step S18, the UDM a Cancel Location Response message without deletion of the UE information (UE context, MM context, and SM context).

When the Update Location Request message is received, the UDM may operate in two manners as follows.

First, it may be possible to delete the old AMF information as the location information of the UE identified by the IMSI and stores the new AMF information as the current location information as before. That is, the UDM may manage only the information on the currently connected AMF, even though the UE has been assigned multiple Temp-IDs.

Second, it may be possible to store both the old AMF information as the previous location information of the UE identified by the IMSI and the new AMF information as the current location information. That is, the UDM may store the information on multiple AMFs that have assigned Temp-IDs to the UE and the information on the AMF to which the UE has currently connected, i.e., new AMF information.

There is a need of a metric to determine whether to assign and manage multiple Temp-IDs in the 5G CN. This metric may be explained with reference to FIG. 1C as follows.

In FIG. 1C, a UE 102 makes a determination of connection to another AMF and sends a currently connected AMF 122b a Detach Request message via a RAN 112 through steps S101 and S102. The Detach Request message includes a detach type-set to "coexistence." Upon receipt of the Detach Request message, the AMF1 122b performs a detach procedure with the UE 102. For example, the AMF1 122b sends the RAN 112 a Detach Response message at step S103. However, the AMF 1 122b does not delete the UE information (UE context, MM context, and SM context) because the detach type is set to "coexistence."

The RAN 112 sends the Detach Response message to the UE 102 at step S104 and, upon receipt of the Detach Response message from the RAN 112, the UE 102 sends a Registration Request message to a new AMF 122a, i.e., AMF 2, via the RAN 112 through steps S105 and 106. The Registration Request message may include a registration type set to "initial registration" and a Temp-ID of the UE 102.

Steps S105 to S110 are performed according to a legacy method. In detail, if the AMF 2 122a receives the Registration Request message, the AMF 2 requests to the AMF 1 122b for UE information at step S107 and receives a response from the AMF 1 122b in response to the request at step S108. The AMF 2 122a also sends the UDM 132 an Update Location Request message at step S109, the Update Location Request message including the IMSI of the UE 102 and AMF information for identifying the AMF to which the UE 102 is currently connected. Upon receipt of the Update Location Request message, the UDM 131 sends, at step S110, the AMF 2 122b a Cancel Location Request message notifying that the UE 102 has connected to another AMF.

Upon receipt of the Cancel Location Request message at step S110, the AMF 1 122a notices that the UE 102 wants to maintain the old Temp-ID based on the previously received Detach Request message. Accordingly, although the AMF 1 122a notices that the AMF 1 122a does need to support any longer the UE 102 that has connected to the new AMF based on the Cancel Location Request message received at step S110, the AMF 1 122a maintains the UE information (UE context, MM context, and SM context). Afterward, the AMF 2 122a may send the UE 102 a Registration Accept message including a newly assigned Temp-ID via the RAN 112 through steps S113 and 114.

FIG. 1D shows when a UE selects and uses individual Temp-IDs. In FIG. 1D, AMF 1 123a is an AMF supporting slices 1, 2, and 3. AMF 2 123b is an AMF supporting slice 4. The UE 103 has the information indicating that the slices 1, 2, and 3 are supported by one AMF and the slice 4 by another. Through the above-described procedure, the UE stores Temp-ID 1 for use in slices 1, 2, and 3 and Temp-ID 2 for use in slice 4. The UE 103 is currently registered with and served by the AMF 123a supporting slices 1, 2, and 3.

In more detail, the UE 103 sends, at step S1001, a RAN 113 a Registration Request message including Temp-ID 1. The RAN 113 checks for the Temp-ID 1 and forwards the Registration Request message to the AMF 1 123a identified by the Temp-ID 1 through steps S1002 and S1003. In the case where the UE 103 is registered with and served by the AMF, it may be possible to skip steps S1004 and S1005. After processing the request from the UE 103, the AMF 1 123a sends the UE 103 a Registration Accept message via the RAN 113 through steps S1006 and S1007.

The UE 103 may make a determination of using the slice 4 during the use of the slices 1, 2, and 3. In this case, the UE 103 initiates UE-triggered slice change at step S1008. The UE 103 sends, at step S1009, the RAN 113 a Registration Request message with the Temp-ID 2 associated with the slice 4. The RAN 113 selects the AMF associated with the Temp-ID 2 included in the Registration Request message and forwards the Registration Request message to the selected AMF 2 123b, i.e., AMF 2, through step S1010 and S1011. Here, the Registration Request message transmitted at steps S1009 and S1011 is a message integrity-protected with the security information related previously by the UE 103 (integrity-protected non-access stratum (NAS) message).

The UDM 133, which received the Registration Request message, performs a location update process with the AMF 1(123a) at step S1012, S1013. Here, the AMF 1 123a may notice that the UE 103 has connected to a new AMF and may not delete the UE information (UE context, MM context, and SM context) as described above. For this purpose, the detach procedure described with reference to FIG. 1C may be performed before the above mentioned procedures.

Afterward, the AMF 2 123b may send a Registration Accept message to the UE 103 via the RAN 113 through steps S1014 and S1015.

Meanwhile, the UDM 133 may store multiple UE Temp-IDs storage capability information as part of the UE subscription information. Whether the multiple Temp-IDs can be stored may be determined based on network slice capability of the UE, slice deployment situation, and non-3GPP network access capability of the UE.

Figure 1E:
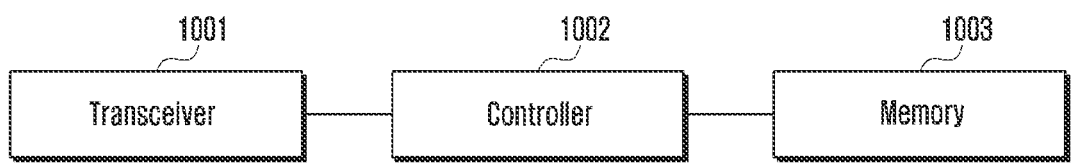
FIG. 1E is a block diagram illustrating a configuration of a UE according to an embodiment of the present disclosure.
Figure 1F:
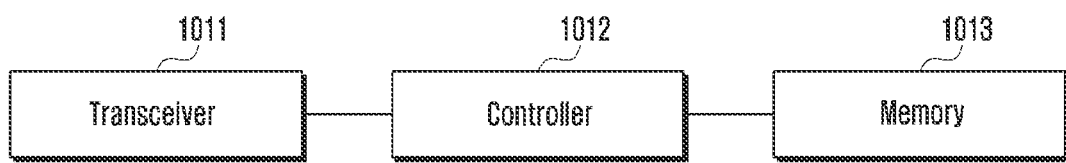
FIG. 1F is a block diagram illustrating a configuration of a base station according to an embodiment of the present disclosure.
Figure 1G:
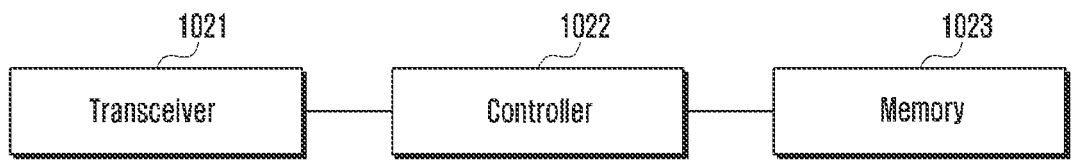
FIG. 1G is a block diagram illustrating a configuration of an AMF according to an embodiment of the present disclosure.

FIG. 1E is a block diagram illustrating a configuration of a UE according to an embodiment of the present disclosure, FIG. 1F is a block diagram illustrating a configuration of a base station according to an embodiment of the present disclosure, and FIG. 1G is a block diagram illustrating a configuration of an AMF according to an embodiment of the present disclosure.

As shown in FIG. 1E, the UE may include a transceiver 1001, a controller 1002, and a memory 1003.

In detail, the transceiver 1001 of the UE may communicate at least one message with a base station over a wireless link to accomplish an operation according to an embodiment of the present disclosure. For example, the transceiver 1001 may transmit a Registration Request message to the base station to initiate a registration procedure with an AMF.

The controller 1002 of the UE may control the transceiver 1001 and the memory 1003 to perform a UE operation according to an embodiment of the present disclosure. For example, the controller 1002 of the UE may control to use a Temp-ID included in a Registration Accept message as a UE identifier or replace an old Temp-ID assigned in the previous registration procedure for a new Temp-ID in the memory 1003, the Temp-ID message being used to transmit a message to the 5G CN after registration.

As shown in FIG. 1F, the base station may include a transceiver 1011, a controller 1012, and a memory 1013 according to an embodiment of the present disclosure.

In detail, the transceiver 1011 of the base station may communicate at least one message with a UE over a wireless link to accomplish an operation according to an embodiment of the present disclosure. For example, the transceiver 1011 may relay a Registration Request message received from the UE to an AMF and a Registration Accept message received from the AMF to the UE, the Registration Accept message including a Temp-ID of the UE.

The controller 1012 of the base station may also control the transceiver 1011 and the memory 1013 to accomplish an operation of the base station according to an embodiment of the present disclosure. For example, the controller 1012 of the base station may control the transceiver 1011 to relay the Registration Request message and Registration Accept message between the UE and the AMF according to an embodiment of the present disclosure.

As shown in FIG. 1G, the AMF may include a transceiver 1021, a controller 1022, and a memory 1023 according to an embodiment of the present disclosure.

In detail, the transceiver 1021 of the AMF may receive a Registration Request message from a base station and send a Registration Accept message to the base station in reply to accomplish an operation according to an embodiment of the present disclosure.

The controller 1022 of the AMF may control the transceiver 1021 and the memory 1023 to accomplish an operation of the AMF according to an embodiment of the present disclosure. For example, the controller 1022 of the AMF may send the terminal the information on the AMF to which the terminal has connected to a UDM, update location information of the terminal based on the Update Location Response message received in response to the AMF information, and assign a Temp-ID to the UE. The controller 1022 may also control the transceiver 1021 to transmit the Temp-ID to the base station.

Although the following description is directed to an evolved Node B (eNB) in a 4G radio access network and a mobility management entity (MME) in a CN that is specified by the 3GPP, the present disclosure is applicable to 5G network entities specified by the 3GPP. For example, a 5G RAN node corresponds to the eNB, and an AMF as a 5G CN entity corresponds to the MME. It will be understood by those skilled in the art that the present disclosure can be applied even to other communication systems having a similar technical background and channel format, with a slight modification, without departing from the spirit and scope of the present disclosure.

In the following description, some of the terms and definitions given in the 3GPP long term evolution (LTE) standard may be used for convenience of explanation. However, the present disclosure is not limited by the terms and definitions, and it can be applied to other standard communication systems.

Definitions of certain terms and words used in the present disclosure are set forth herein below.

Layer 2 Relay: Relay service provided via medium access control (MAC), radio link control (RLC), and packet data convergence protocol (PDCP) layers (collectively called Layer 2) above physical layer (PHY) (Layer 1) in 3GPP release 15. Accordingly, remote UE signaling and data received via a relay UE may be recognized as being transmitted by the remote UE on the radio resource control (RRC) layer and NAS layer.

Remote UE: D2D-enabled UE using relay service for access to 3GPP network and data and signaling transmission/reception.

Relay UE: D2D-enabled UE attached to 3GPP network and establishing D2D link or PC5 link with remote UE for providing relay service. The relay UE relays signals between a remote UE and an eNB/CN entity.

eNB: base station called 5G RAN in 5G. An eNB is responsible for radio resource utilization of UEs.

MME: CN entity managing UE mobility and corresponding to 5G AMF. An MME is responsible for managing and supporting the low power function of UEs.

Home subscriber server (HSS): database storing UE subscriber information and connected to SCEF capable of partially modifying configuration information of subscriber information. The HSS corresponds to the UDM in 5G.

Service capability exposure function (SCEF): entity connecting $3^{rd}$ party application server to 3GPP network entity to expose service capability of 3GPP network to $3^{rd}$ party and enable services. For example, the SCEF receives information on wakeup period of a UE, once the UE is connected, from the $3^{rd}$ party application server and registers the corresponding value with the HSS, which configures CN entities, eNB, and UE based on the registered value. The SCEF corresponds to the 5G Network Exposure Function (NEF).

SCS/AS: 3rd party application server.

PC5: radio interface for 3GPP D2D service.

DRX: mechanism defining wakeup cycle of UE for listening to signaling from a network. The shorter the cycle, the more the power consumption; the longer the cycle, the less the power consumption. However, there is a trade-off in that communication delay time increases as the wakeup cycle increases. The MME may configure a DRX value per UE and notify the eNB and UE of the DRX value. In the present disclosure, the DRX and extended DRX(eDRX) are collectively referred to as just DRX.

PSM: acronym of power saving mode as function provided in 4G. A CN entity determines that a UE entering the PSM is unreachable. That is, the UE disables modem operation. An active timer is defined for a data transmission/reception available before the UE enters the PSM. The PSM may correspond to the mobile initiated communication only mode in 5G.

Active timer: time value corresponding to time period defined for UE to transmit/receive data before entering PSM in which data reception is impossible. The MME assigns the active time value.

Communication pattern: cycle or pattern for providing data traffic service appropriate for UE. The application server may set a communication pattern of a certain UE via the SCEF. For example, the active server may send a CN entity the information such as delayed communication characteristics of the service to be provided to the UE, data communication time demanded by the UE, and how long the UE has to continue data communication once it starts. If the communication pattern includes a value indicating that the UE continues data communication for about 1 minute once the UE wakes up, the CN may maintain the state of the corresponding UE in the connected state for 1 minute through interoperation with the eNB. That is, the communication pattern information includes communication periodicity, period of communication, communication duration time, scheduled communication time (e.g., at noon every Monday), and information on whether the UE is mobile or stationary.

FIG. 2A is a signal flow diagram illustrating a procedure for a CN entity to provide a relay UE of low power function information for use by the relay UE in establishing a PC5 link.

An SC S/AS 250 may configure a communication pattern of a UE via an SCEF 240. For example, the SCS/AS 250 requests a CN entity to configure delayed communication characteristics of the service to be provided to the UE, data communication time demanded by the UE, and how long the UE has to continue data communication once the UE starts. Upon receipt of this request, the SCEF 240 sends the request to an HSS 230, and the HSS 230 accepts the request and saves the configuration information as part of the subscription information of the UE. The HSS 230 sends configuration information to the MME 220 when the UE connects to the MME 220. It may also be possible to configure a DRX value and an active timer value as well as the communication pattern in the same manner at step S201.

The HSS 230 may include the DRX value determined for use by the UE according to the type or subscription information of the UE in the subscription information. For example, a UE that sporadically wakes up may have its subscription information including the eDRX. It may also be possible to include an active timer value in the subscription information.

The MME 220 may set an active timer value to be assigned to a UE as an internal setting value. In another way, it may also be possible to set the active timer to an active timer value as requested by the UE without modification.

A remote UE 200a performs a registration procedure to connect to the CN at step S202. The registration procedure may be initiated by transmitting an attach request message, a tracking area update request message, or a Registration Request message in 5G. This message may include an eDRX value or an active timer value that the UE wants to use. Upon receipt of this message, the MME 220 may assume that the eDRX or active timer value included in the message as the value that the UE wants and, at step S203, set the corresponding parameter to a value transmitted by the UE, a value configured by the HSS 230, or an internal setting value as described above.

The MME 220 determines an expected UE behavior (information on how long the connection should be maintained) according to the DRX value, active timer value, or communication pattern value. This determination is made according to the above-described method in consideration of a value configured in response to a request from a $3^{rd}$ party, a value configured in the subscription information, an internal setting value, or a value requested by the UE.

At step S204, the MME 220 sends the remote UE 200a a response message in reply to the Registration Request message. This response message may be an Attach Accept message, a tracking area update accept message, or a Registration Accept message in 5G. The MME 220 includes an eDRX value or active value for use by the UE in the response message.

Upon receipt of the response message, the remote UE 200a performs an operation according to the eDRX value or active timer value contained in the response message. The MME 200 may send the eNB 210 the expected UE behavior determined according to the communication pattern configured at the previous step in the course of transmitting the response message to the UE via the eNB 210. The expected UE behavior is taken into consideration when the eNB 210 determines RRC inactivity of the corresponding remote UE 200a. That is, the eNB 210 takes the expected UE behavior transmitted by the MME 220 into consideration for determining whether to maintain the RRC connection of the UE.

According to an embodiment of the present disclosure, the MME 220 identifies the relay UE 200b that has relayed the message to the remote UE 200a. The MME 220 assumes that a message transmitted by the remote UE 220a after the MME's acceptance of the request made, by the relay UE 200b after being connected to the UE 200a, for relay service authorization is relayed by the relay UE 200b.

According to an embodiment of the present disclosure, when the relay UE 200b relays an NAS message transmitted by the remote UE 200a to the eNB 210, the eNB 210 which notices the message is relayed sends the MME 220 the NAS message along with the information on the relay UE 200b.

This means that an S1 message (or N2 message) conveying the message transmitted by the eNB 210 over an S1 interface or N2 interface in 5G between the eNB 210 and the MME 220 includes an indicator indicating that the message is relayed by the relay UE 200b or the ID of the relay UE 200b. In this way, the MME 220 may notice that the NAS message received from the remote UE 200a is relayed by the relay UE 200B and identify the relay UE 200b.

According to an embodiment of the present disclosure, the MME 220 may send the relay UE 200b the information used for relaying the message transmitted by the remote UE 200a by means of an NAS message. The corresponding information may be conveyed in a legacy NAS message or piggybacked, at step S205, on an NAS message conveying the message including assistance information for the relay operation.

The information used for the relay operation may include the eDRX value or active timer value for PSM that has been transmitted from the MME 220 to the remote UE 200a or the expected UE behavior (information on how long the connection should be maintained) that has been transmitted from the MME 220 to the eNB 210 at one of the previous steps. The above message includes the ID of the remote UE 200a which makes it possible to identify a remote UE to which the information is applied. The above message may include information on multiple remote UEs 200a.

According to an embodiment of the present disclosure, the MME 220 may set the DRX or PSM of the relay UE 200b to a value equal to or less than those values of all remote UEs 200a served by the relay UE 200b. If the DRX of the relay UE 200b is longer than the DRX of the remote UE 200a, the relay UE 200b may fail to monitor the paging channel for the paging message for the remote UE 200a. For this reason, the DRX of the relay UE 200b should be shorter than the DRX of the remote UE 200a for receiving the paging message for the remote UE 200a.

According to an embodiment of the present disclosure, the MME 220 and the eNB 210 may assume that the DRX cycles of the remote UE 200a and the relay UE 200b are identical with each other. This aims to make it possible for the relay UE 200b to wake up at its paging occasion to receive a paging message rather than additionally receiving the paging message for the remote UE 200a and, if the received paging message is of the remote UE 200a, performs a corresponding operation over the PC5 link.

According to an embodiment of the present disclosure, the relay UE 200b that has received the above information saves, at step S206, the information for the remote UE 200a connected thereto. The relay UE 200b uses the saved information on the PC5 link established with the remote UE 200a at step S207.

According to a detailed embodiment, assuming that the eDRX of the remote UE 200a is set to 20 seconds, the relay UE 200b applies the corresponding value to the PC5 link established with the remote UE 200a to monitor the PC5 link every 20 seconds. According to a detailed embodiment, assuming that the active timer of the remote UE 200a is set to 20 seconds and thus the remote UE 200a is supposed to enter the PSM if there is no data transmission/reception for 20 seconds, the relay UE 200b monitors the PC5 link established with the remote UE 200a; determines, if there is no data transmission/reception for 20 seconds, that the remote UE 200a has entered the PSM; and releases the PC5 link established with the remote UE 200a. According to a detailed embodiment, if the MME 220 notifies the relay UE 200b of the expected UE behavior of the remote UE 200a, the relay UE 200b may predict a keep-alive duration of the PC5 link with the remote UE 200a for data communication. Accordingly, the relay UE 200b maintains the PC5 connection with the remote UE 200a during the period as notified by the MME 220.

According to an embodiment of the present disclosure, the relay UE 200b that has applied the low power function for the remote UE 200a to the PC5 link as above may operate as follows when the network pages the remote UE 200a. If downlink data arrives, the MME 220 pages the remote UE 200a. In order to page the remote UE 200a, the MME 220 sends a paging message for the remote UE 200a to the eNB 210 at step S208 and, in this case, the paging message may include an eDRX value for the remote UE 200a. If the MME 220 determines that the remote UE 200a is in the PSM, the UE sends no paging message.

If the paging message is received, the eNB 210 determines the paging occasion appropriate for the eDRX value and broadcasts the paging message to wake up the remote UE 200a at the paging occasion using radio resources. If the relay UE 200b is configured to wake up for the eDRX of the remote UE 200a, the relay UE 200b may receive, at step S209, the paging message broadcast by the eNB 210 on behalf of the remote UE 200a. Then, the relay UE 200b sends the paging message to the remote UE 200a in consideration of the DRX cycle on the PC5 link. If the relay UE 200b is not configured to wake up for the eDRX cycle of the remote UE 200a, the eDRX value included in the paging message transmitted from the MME 220 to the eNB 210 should be a value for the relay UE 200b; in this case, the relay UE 200b receives the paging message at its paging occasion and, if the paging message is for the remote UE 200a, sends a PC5 message to the remote UE 200a in consideration of the DRX cycle of the PC5 link for the remote UE 200a through steps S210 and S211.

FIG. 2B is a signal flow diagram illustrating a procedure by which a remote UE sends low power function information received from a CN entity to a relay UE through a PC5 link in order for the relay UE to apply the information to the PC5 link.

An SCS/AS 251 may configure a communication pattern of a UE via an SCEF 241. For example, the SCS/AS 251 requests a CN entity to configure delayed communication characteristics of the service to be provided to the UE, data communication time demanded by the UE, and how long the UE has to continue data communication once data communication starts. Upon receipt of this request, the SCEF 241 forwards the request to an HSS 231, and the HSS 231 accepts the request and saves the configuration information as part of the subscription information of the UE. The HSS 231 sends configuration information to the MME 221 when the UE connects to the MME 221. It may also be possible to configure a DRX value and an active timer value as well as the communication pattern in the same manner at step S2001.

The HSS 231 may include the DRX value determined for use by the UE according to the type or subscription information of the UE in the subscription information. For example, a UE waking up sporadically may have its subscription information including the eDRX. It may also be possible to include an active timer value in the subscription information.

The MME 221 may set an active timer value to be assigned to a UE as an internal setting value. In another way, it may also be possible to set the active timer to an active timer value as requested by the UE without modification.

A remote UE 201a performs a registration procedure to connect to the CN. The registration procedure may be initiated by transmitting an attach request message, a tracking area update request message, or a Registration Request message in 5G at step S2002. This message may include an eDRX value or an active timer value that the UE wants to use. Upon receipt of this message, the MME 221 may assume that the eDRX or active timer value included in the message is the value that the UE wants and set the corresponding parameter to a value as requested by the UE, a value configured by the HSS 231, or an internal setting value as described above.

The MME 221 determines an expected UE behavior (information on how long the connection should be maintained) according to the DRX value, active timer value, or communication pattern value at step S2003. This determination is made according to the above-described method in consideration of a value configured in response to a request from a $3^{rd}$ party, a value configured in the subscription information, an internal setting value, or a value requested by the UE.

The MME 221 sends the remote UE 201a a response message in reply to the Registration Request message at step S2004. This response message may be an Attach Accept message, a tracking area update message, or a Registration Accept message in 5G. This message includes an eDRX value or active timer value. The UE that has received the response message undertakes an operation according to the eDRX value or active timer value included in the response message.

According to an embodiment of the present disclosure, the remote UE 201a sends the relay UE 201b, at step S2005, a message including the eDRX value, active timer value, or communication pattern received from the MME 221 through the PC5 link. The corresponding information may be conveyed in a legacy PC5 message or piggybacked, at step 2005, on a PC5 message conveying the message including assistance information for the relay operation.

The information used for the relay operation may include the eDRX value or active timer value for PSM that has been transmitted from the MME 221 to the remote UE 201a or the communication pattern of the UE that has been configured by a $3^{rd}$ party AS to the HSS 231 via the SCEF 241. According to an embodiment of the present disclosure, the above information may include the value arbitrarily configured by the remote UE 201a rather than the value provided by the MME 221. That is, since the corresponding value is applicable on the PC5 link, the remote UE 201a may set the value and request to the relay UE 201b for application of the value over the PC5 link without involvement of the CN.

The relay UE 201b sends a response message in reply to the above message to notify the remote UE 201a whether the relay UE 201b supports and to apply the corresponding value. The relay UE 201b may assign a value in consideration of the value requested by the remote UE 201a and sends the response message including assigned value. In the case where the eDRX value of the remote UE 201a is less than the eDRX value of the relay UE 201b, the relay UE 201b may send the remote UE 201a the response message including the eDRX value set to be greater or less than its eDRX value.

For example, although the remote UE 201a requests to set the eDRX cycle to 10 seconds, the relay UE 201b may send the remote UE 201a the response message including the eDRX cycle set to 20 seconds. This aims to make it possible for the relay UE 201b to perform monitoring at the paging occasion of the remote UE 201a and relay the paging message by protecting against the paging message reception failure that may be caused by eDRX. This also aims to make it possible for the relay UE 201b to relay the paging message for the remote UE 201a over the PC5 link immediately upon receipt of the paging message. This is because the relay UE 201b can send the remote UE 201a the paging message with no delay when the DRX cycle of the relay UE 201*b* matches the DRX cycle configured on the PC5 link.

According to an embodiment of the present disclosure, the relay UE 201*b* that has received the above information saves, at step S2006, the information for the remote UE 201*a* connected thereto. The relay UE 201*b* uses the saved information on the PC5 link established with the remote UE 201*a* at step S2007.

According to a detailed embodiment, assuming that the eDRX of the remote UE 201*a* is set to 20 seconds, the relay UE 201*b* applies the corresponding value to the PC5 link established with the remote UE 201*a* to monitor the PC5 link every 20 seconds. According to a detailed embodiment, assuming that the active timer of the remote UE 201*a* is set to 20 seconds and thus the remote UE 201*a* is supposed to enter the PSM if there is no data transmission/reception for 20 seconds, the relay UE 201*b* monitors the PC5 link established with the remote UE 201*a*; determines, if there is no data transmission/reception for 20 seconds, that the remote UE 201*a* has entered the PSM; and releases the PC5 link established with the remote UE 201*a*. According to a detailed embodiment, if the remote UE 201*a* notifies the relay UE 201*b* of its communication pattern, the relay UE 201*b* may predict a keep-alive duration of the PC5 link with the remote UE 201*a* for data communication. Accordingly, the relay UE 201*b* maintains the PC5 connection with the remote UE 20*aa* during the period as notified by the remote UE 201*a*.

According to an embodiment of the present disclosure, the relay UE 201*b* that has applied the low power function for the remote UE 201*a* to the PC5 link as above may operate as follows when the network pages the remote UE 201*a*.

If downlink data arrive, the MME 221 pages the remote UE 201*a*. In order to page the remote UE 201*a*, the MME 221 sends a paging message for the remote UE 201*a* to the eNB 210 at step S2008. If the MME 220 determines that the remote UE 200*a* is in the PSM, the MME 220 sends no paging message. If the paging message is received, the eNB 211 determines the paging occasion appropriate for the eDRX value and broadcasts the paging message to wake up the remote UE 201*a* at the paging occasion using radio resources.

If the relay UE 201*b* is configured to wake up for the eDRX of the remote UE 201*a*, the relay UE 201*b* may receive, at step S2009, the paging message broadcast by the eNB 211 on behalf of the remote UE 201*a*. Then, the relay UE 201*b* sends the paging message to the remote UE 201*a* in consideration of the DRX cycle on the PC5 link. If the relay UE 201*b* is not configured to wake up for the eDRX cycle of the remote UE 201*a*, the eDRX value included in the paging message transmitted from the MME 221 to the eNB 211 should be a value for the relay UE 201*b*; in this case, the relay UE 201*b* receives the paging message at its paging occasion and, if the paging message is for the remote UE 201*a*, sends a PC5 message to the remote UE 201*a* in consideration of the DRX cycle of the PC5 link for the remote UE 201*a* through steps S2010 and S2011.

Figure 2C:
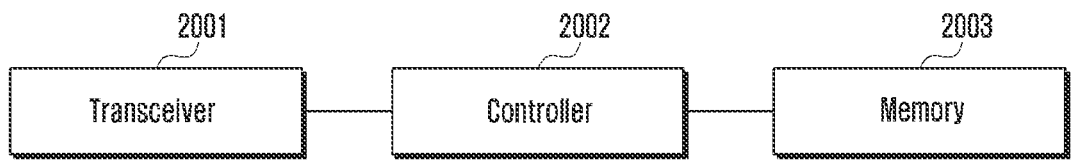
FIG. 2C is a block diagram illustrating a configuration of a UE according to an embodiment of the present disclosure.
Figure 2D:
FIG. 2D is a block diagram illustrating a configuration of an eNB according to an embodiment of the present disclosure.
Figure 2E:
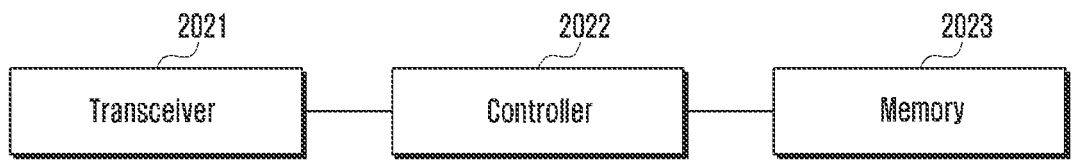
FIG. 2E is a block diagram illustrating a configuration of an MME according to an embodiment of the present disclosure.

FIG. 2C is a block diagram illustrating a configuration of a UE according to an embodiment of the present disclosure, FIG. 2D is a block diagram illustrating a configuration of an eNB according to an embodiment of the present disclosure, and FIG. 2E is a block diagram illustrating a configuration of an AMF according to an embodiment of the present disclosure.

As shown in FIG. 2C, the UE may include a transceiver 2001, a controller 2002, and a memory 2003. According to an embodiment of the present disclosure, the UE configured as shown in FIG. 2C may operate as a remote UE and/or relay UE.

According to an embodiment of the present disclosure, the transceiver 2001 of the UE may communicate at least one message with a base station and at least one other UE over wireless links to accomplish an operation according to an embodiment of the present disclosure. For example, the transceiver 2001 may transmit a Registration Request message to the eNB or receive a paging message transmitted by the MME.

The controller 2002 of the UE may control the transceiver 2001 and the memory 2003 to perform a UE operation according to an embodiment of the present disclosure. According to an embodiment of the present disclosure, the controller 2002 of the UE operating as a relay UE may control the transceiver 2001 to monitor for receiving a paging message in consideration of a preconfigured DRX cycle and, if a paging message for another UE (remote UE) is received, send the paging message to the remote UE. The controller 2002 of the UE operating as a remote UE controls the transceiver 2001 to receive the paging message transmitted by an MME from another UE in consideration of a preconfigured DRX cycle.

As shown in FIG. 2D, the eNB may include a transceiver 2011, a controller 2012, and a memory 2013.

In detail, the transceiver 2011 of the eNB may communicate at least one message with a UE over a wireless link and forward a message received from the UE to an MME to accomplish an operation according to an embodiment of the present disclosure. For example, the transceiver 2011 of the eNB may send a Registration Request message received from the UE to the MME according to an embodiment of the present disclosure. If a paging message for the UE is received from the MME, the controller of the eNB controls the transceiver 2011 to send the paging message to a relay UE.

The controller 2012 of the eNB may control the transceiver 2011 and the memory 2013 to accomplish an operation of the eNB according to an embodiment of the present disclosure. For example, the controller 2012 of the eNB may control the transceiver 2011 to relay a registration message and a paging message between a UE and an MME.

As shown in FIG. 2E, the MME may include a transceiver 2021, a controller 2022, and a memory 2023.

In detail, the transceiver 2021 of the MME may receive a Registration Request message from an eNB to accomplish an operation according to an embodiment of the present disclosure. The transceiver 2021 may also send configured relay assistance information to a relay UE.

The controller 2022 of the MME may control the transceiver 2021 and the memory 2023 to accomplish an operation of the MME according to an embodiment of the present disclosure. For example, the controller 2022 of the MME may determine a DRX cycle and a PSM cycle for a UE based on the Registration Request message received from the UE. The controller 2022 may also control the transceiver 2021 to transmit a paging message for a UE.

Various embodiments of the present disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the present disclosure. Further, the following terms are defined in consideration of the functionality in the present disclosure, and they may vary according to the intention of a user or an operator, usage, etc. Therefore, the definition should be made on the basis of the overall content of the present specification.

Although the description is directed to the communication standards specified by the 3GPP, it will be understood by those skilled in the art that the present disclosure can be applied even to other communication systems having a similar technical background and channel format, with a slight modification, without departing from the spirit and scope of the present disclosure.

In the following description, the terms "slice," "service," "network slice," "network service," "application slice," and "application service" may be interchangeably used.

Figure 3A:
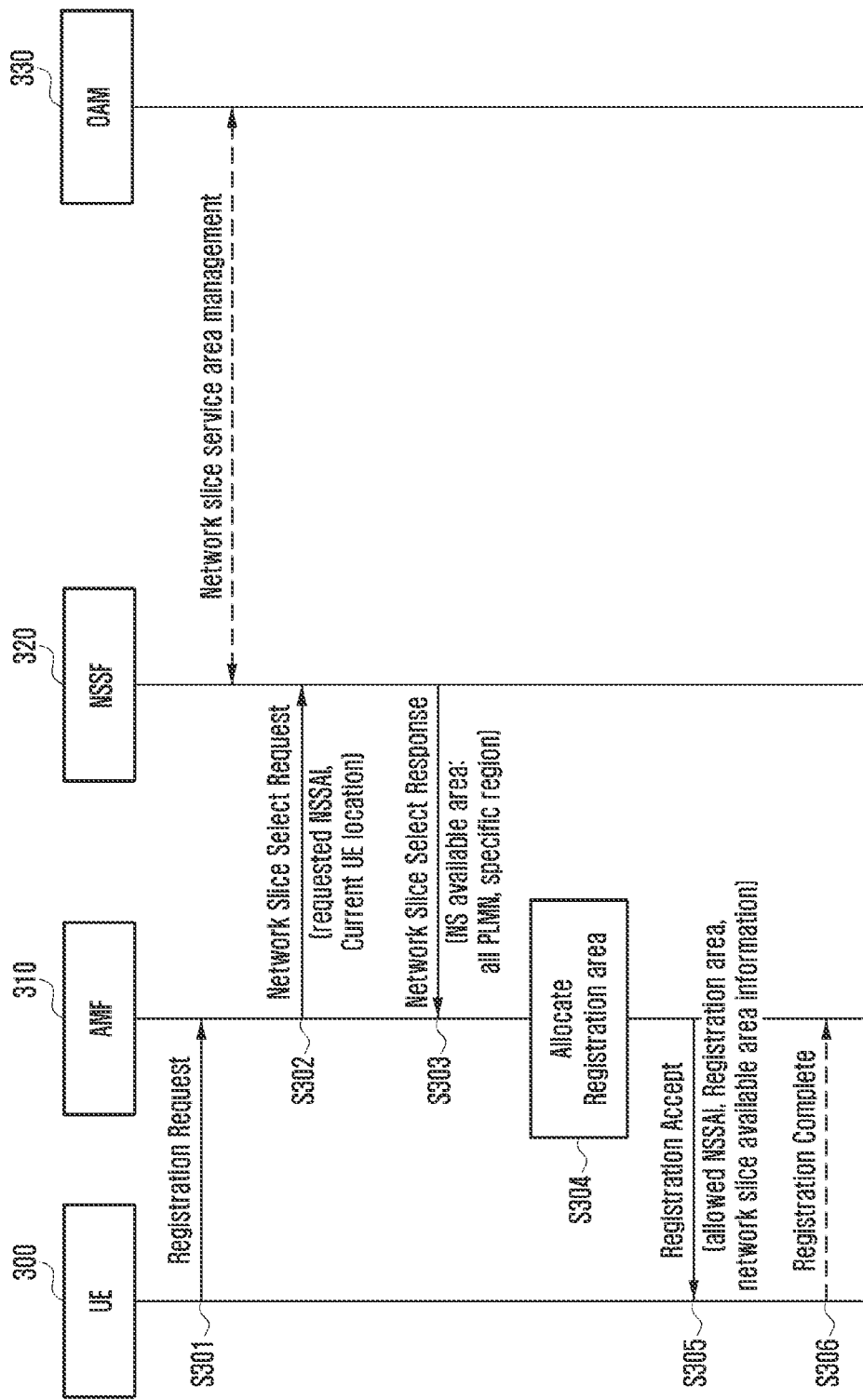
FIG. 3A is a signal flow diagram illustrating a procedure for an AMF to acquire information on an area capable of being served by network slices from an NSSF according to an embodiment of the present disclosure.

FIG. 3A is a signal flow diagram illustrating a procedure in which an AMF sends information on a network slice requested by a UE and a current location of the UE to an NSSF and, in reply, the NSSF sends information on network slices available for use by the UE and areas supporting the network slices to the AMF.

The UE 300 sends a Registration Request message to the AMF 310 at step S301 to connect to the network. The AMF 310 performs a procedure for selecting a network slice available for the UE 300 based on requested network slice selection assistance information (NSSAI) included in the Registration Request message transmitted by the UE 300.

In order to perform the network slice selection procedure, the AMF 310 sends the NSSF 320 a Network Slice Select Request message at step S302. This message is not limited by its name, and it may be any of all messages intended for the AMF 310 to acquire network slice-related information from the NSSF 320.

The Network Slice Select Request message by the AMF 310 may include the UE ID and the requested NSSAI sent by the UE 300. The AMF 310 may send the requested NSSAI sent by the UE 300 to the NSSF 320 without any modification, or the AMF 310 may transmit a query to a UDM (subscriber information storage device) to acquire subscribed NSSAI available for the UE 300, compare the acquired NSSAI and the requested NSSAI transmitted by the UE, and send the NSSF 320 the intersection of the NSSAIs as an extracted requested NSSAI.

The Network Slice Select Request message may also include information on the current access location of the UE 300 such that the NSSF 320 notices the area where the UE 300 wants to use the service. The current UE access position information may be a cell ID, tracking area ID, or an eNB ID. This information may not be included in the Network Slice Select Request message and, in this case, the NSSF 320 may determine the area where the UE 300 is located based on the AMF that has transmitted the Network Slice Select Request message. Detailed descriptions thereof are made in another embodiment.

The NSSF 320 determines whether the requested NSSAI is available for the UE 300 based on the information included in the Network Slice Select Request message and determines NSSAI available for the UE 300. According to an embodiment of the present disclosure, the NSSF 320 obtains the information on the area where the UE is capable of using the NSSAI. The NSSF 320 has the information on the areas available for the services of the network slices. Accordingly, the NSSF 320 may configure the information on the area where the corresponding network slice is available in association with the NSSAI allowed for use by the UE 300. In the present disclosure, this area is referred to as network slice-available area for convenience of explanation.

According to a detailed embodiment of the present disclosure, the area information may be set to "All PLMN" to indicate that the UE 300 can use the NSSAI in the entire area of the PLMN to which the UE is connected. In this case, the UE may use the corresponding NSSAI in the entire area of the PLMN to which the UE has connected. According to a detailed embodiment, the NSSF 320 may set the area information to network slice available area. In this case, the NSSF 320 may determine the area based on the current UE location information included in the Network Slice Select Request message sent by the AMF 310.

For example, if the access location of the UE 300 is Seoul and if the network slice requested by the UE 300 is available only in Seoul, the NSSF may configure the area information indicating Seoul or an area list covering Seoul. The area information may be configured per Cell ID, eNB ID, or tracking area. The area information may also be configured with Global Positioning System (GPS) information or address information (zip code, postal code, etc.) as representative geographical location information.

After determining the network slice available area for the network slice for use by the UE 300, the NSSF 320 sends a response to the AMF 310. When there are multiple network slices allowed for use by the UE 300, if the network slices have different service-available areas, the NSSF 320 may notify the AMF 310 of available areas per network slice.

In this case, the NSSF 320 maps the individual network slices to respective service-available areas to generate the service-available area information in the form of a cell ID list, an eNB ID list, a tracking area list, or geographical location information of the corresponding areas (GPS, civic address, zip code, postal code, etc.). The NSSF 320 generates a message including the allowed NSSAI and service-available area information per-network slice and sends this message to the AMF 310, at step S303, in response to the Network Slice Select Request message.

The NSSF 320 may acquire the network slice available area information from an operation, administration, and management (OAM) 330 as a device administrating the PLMN. The OAM 330 as a device for a network operator to manage the network makes it possible for the network operator to determine and configure the serving areas and networks slices for supporting the services. The NSSF 320 may receive and save, in advance, the network slice available area information and NSSAI that the OAM 300 has configured or inquire to the OAM 330 about the network slice available area information and NSSAI upon receipt of the network slice select request message transmitted by the AMF 310.

According to a detailed embodiment of the present disclosure, the NSSF 320 may acquire the information of the serving area of the AMF 310 that has transmitted the Network Slice Select Request message or have the information on the serving areas of the AMFs supporting the allowed NSSAI for the UE 300 and thus transmit the information similar to the network slice available area information based on the serving areas information of the AMFs. This is not limited to the case where the AMF 310 notifies the NSSF 320 of the current location of the UE 300 as described in the above embodiment, and it may be applicable to the case where the AMF 310 does not notify the NSSF 320 of the current location of the UE 400. In this embodiment, the term "AMF address" denotes an Internet Protocol (IP) address or fully qualified domain name (FQDN) of the AMF.

In the first approach, the AMF 310 sends the NSSF 320 the Network Slice Select Request message including its serving area information. The AMF 310 may generate its serving area information per tracking area and include the serving area information in the Network Slice Select Request message. It may also be possible to generate the information on specific areas in the form of a civic address, GPS information, zip code, postal code, etc. rather than the Tracking Area.

Upon receipt of the Network Slice Select Request message, the NSSF 320 may extract the information on the serving area of the AMF 310 from the message. The NSSF 320 determines the allowed NSSAI for the UE 300 and determines whether the AMF 310 that has transmitted the Network Slice Select Request message supports the allowed NSSAI based on the AMF service area information transmitted by the AMF 310.

If it is determined that the allowed NSSAI for the UE 300 is supportable in the serving area of the AMF 310 that has sent the Network Slice Select Request message, the NSSF 320 sends the AMF 310 a response message including the allowed NSSAI, but the NSSF 320*t* does not send addresses of other AMFs in response to the Network Slice Select Request message. Upon receipt of this message, the AMF 310 may notice that the AMF 310 can support the allowed NSSAI for the UE because no other AMF address is included.

If it is determined that the allowed NSSAI for the UE 300 is not supportable in the serving area of the AMF 310 that has sent the Network Slice Select Request message, the NSSF 320 sends the AMF 301 a response message including the allowed NSSAI along with the addresses of other AMFs in response to the Network Slice Select Request message. Upon receipt of this message, the AMF 310 may notice that the allowed NSSAI is supportable in the serving areas of the corresponding AMFs and then selects one of the AMFs to perform an AMF relocation procedure. During this procedure, the AMF 310 forwards the information received from the NSSF 320 to the new AMF.

In the second approach, the NSSF 320 acquires the information on the serving area of the corresponding AMF based on the ID of the AMF 310 that has transmitted the Network Slice Select Request message. The AMF 310 may send the Network Slice Selection Request message including its address or ID. The NSSF 320 may acquire the information on the serving area of the AMF 310 based on the address of the AMF 310, and the information may be a value set by a network management function via the OAM 330. The NSSF 320 may acquire the information on the serving area of the corresponding AMF based on the ID or Name of the AMF. The AMF ID may consist of an AMF region ID or an AMF region ID and an AMF set ID, the AMF region ID indicating a region composed of one or multiple AMF sets, and the AMF set ID may be an ID of a group of AMFs constituted in a region corresponding to the Region ID. This may mean that region ID is determined based on the largest area consisting of one or multiple AMF sets, and the AMF Set ID is determined based on an area more delicately than the largest area, according to regions associated with the AMFs.

Accordingly, the NSSF 320 may determine the serving area of the AMF that has transmitted the Network Slice Select Request message with an AMF region ID or AMF region ID+AMF Set ID among the AMF IDs. In order to acquire the information on a region corresponding to the AMF region ID or AMF region ID+AMF Set ID, the NSSF retrieves a predetermined value or receives a value set by the network management function via the OAM.

A description is made of the procedure for determining whether the AMF 310 is capable of supporting the allowed NSSAI in the response message that the NSSF 320 has transmitted in response to the Network Slice Selection Request message and identifying the network slice available area according to an embodiment of the present disclosure.

In detail, the NSSF 320 determines an allowed NSSAI for use by the UE 300, determines an area supporting the allowed NSSAI, and determines whether the allowed NSSAI is supported by the AMF 310 that has transmitted the Network Slice Select Request message or other AMFs. The NSSF 320 may determine the serving area of the AMF based on the address or ID of the AMF using a method according to an embodiment of the present disclosure.

Then, the NSSF 320 identifies the service available area of the network slice serving the allowed NSSAI and, if it is determined that the AMF 310 that has transmitted the Network Slice Select Request message supports the corresponding allowed NSSAI and the serving area of the corresponding AMF supports the corresponding allowed NSSAI, sends the corresponding AMF a response including the allowed NSSAI in reply to the Network Slice Select Request message.

If the response message includes no specific region information, the AMF 310 may determine that all of the allowed NSSAI is supported within its serving area. If the response message includes a specific region information, this may be the information generated by mapping the network slice information constituting the NSSAI to service available areas in the form of a cell list, eNB list, or tracking area list.

If it is determined that the AMF 310 that has transmitted the Network Slice Select Request message cannot support the allowed NSSAI, the NSSF 320 determines the AMFs supporting the allowed NSSAI in consideration of the serving areas of the AMFs. The NSSF 320 may acquire the information on the serving areas of the individual AMFs based on the addresses of the AMFs serving certain areas that the NSSF 320 already knows or by determining whether the individual AMFs support the allowed NSSAI based on the preconfigured AMF region ID or AMF region ID+AMF set ID for the corresponding areas. The above configuration may be obtained from a network management function such as OAM.

After determining the AMFs supporting the allowed NSSAI, the NSSF 320 sends the AMFs a response message including the allowed NSSAI and an AMF address or ID list corresponding to the allowed NSSAI in response to the Network Slice Select Request message. Upon receipt of the response message, the AMF 310 determines that the AMF 310 cannot serve the allowed NSSAI for the corresponding UE and thus selects an AMF from the received AMF list to perform an AMF relocation procedure. During this procedure, the AMF forwards the information received from the NSSF to the new AMF.

When there are multiple network slices allowed for use by the UE, if the network slices have different service available areas, the NSSF 320 may generate the allowed NSSAI by mapping the per-network slice information to the AMF addresses capable of serving the corresponding network slices. This information is configured in such a way of indicating the network slices supportable per AMF address or ID or, in contrast, mapping individual network slices to the addresses or IDs of the AMFs supporting the corresponding network slices.

This embodiment is directed to the operation of allocating a registration area after the AMF receives the allowed NSSAI and network slice service available area information from the NSSF or after a new AMF selected for supporting the allowed NSSAI completes an AMF relocation procedure.

The network slice service available area information is sent to the AMF along with the allowed NSSAI using the above-described method according to various embodiments. The AMF 310 receives NSSAI allowed for use by the UE 300 and corresponding network slice available area information from the NSSF 320 and allocates a registration area to the UE 300 at step S304.

According to an embodiment of the present disclosure, the AMF 310 checks for the network slice available area and, if the corresponding information is a cell ID list, analogizes a tracking area corresponding to the cell ID list. If the corresponding information is an eNB ID list, the AMF 310 analogizes the tracking area from the serving information of the eNBs contained in the eNB ID list. If the corresponding information is a tracking area list, the AMF 310 identifies the tracking area based on the tracking area IDs contained in the tracking area list. If the corresponding information is geographical location information (e.g., GPS, civic address, zip code, and postal code), the AMF 310 analogizes the tracking area based on the geographical location information.

The AMF 310 determines the network slices available in a tracking area (TA), as a basic unit of UE location management, indicated by a TA ID (TAI) and maps the NSSAI to the TAI for allocating a registration area to the UE 300. For example, if the TA identified by TAI 1 supports NSSAI 1 and NSSAI 2, the AMF 310 maps the NSSAI 1 and NSSAI 2 to TAI 1 for allocating a registration area to the UE 30. If TA identified by TAI 2 supports NSSAI 1, the AMF 310 maps NSSAI 1 to TAI 1 and sends the mapping to the UE 300. It may also be possible to generate a TAI list for NSSAI 1 and a TAI list for NSSAI 2 and designate a registration area list per NSSAI.

According to a detailed embodiment, the AMF 310 may derive the registration area to be allocated to the UE 300 from an intersection of a service restriction area of the UE 300 and the network slice available area received from the NSSF 320 and allocate part or whole of the intersection to the UE 300 according to the mobility characteristic of the UE 300. According to a detailed embodiment, the AMF 310 may allocate the registration area to support as many network slices as possible. For example, if a relatively small area where the UE is currently located supports network slices #1, #2, and #3 and a relatively large area supports network slices #1 and #2, the AMF configures a registration area supporting the network slices #1, #2, and #3 and allocates the registration to the UE.

According to an embodiment of the present disclosure, the AMF 310 notifies the UE 300 of the allowed NSSAI available in the current registration area explicitly when allocating the registration area to the UE 300. That is, if the current AMF 310 supports only network slices #1 and #2 for the UE 300 at the current location although the allowed NSSAI for use by the UE 300 is supported by network slices #1, #2, and #3, the AMF may notify the UE 300 that the network slices #1 and #2 are available in the current registration area.

At this time, the AMF 310 may allocate a registration area supporting as many network slices as possible among the network slices of the allowed NSSAI. Afterward, the AMF 310 may send, at step S305, the UE 300 a Registration Accept message including the allowed NSSAI along with a marking of availability for the network slices available currently in the registration area and information on the network slices composing the corresponding allowed NSSAI, an indicator indicating only the network slices available in the current registration area, or a marking or indicator indicating the network slices unavailable in the current registration area.

Although the AMF 310 sends the UE 300 the "allowed NSSAI supported in the current registration area" in this embodiment, the present disclosure is not limited by the message type or data format but includes embodiments of transmitting any information indicative of network slices supporting the allowed NSSAI in the registration area that the current AMF 310 has allocated to the UE 300.

Accordingly, when the UE 300 moves out of the UE's registration area, the UE 300 sends an AMF a Registration Request message including a requested NSSAI for the network slices that have not supported the allowed NSSAI. If the Registration Request message is received, the AMF may determine whether the UE 300 can use the NS SAI at the corresponding location based on the context received from the old AMF or the previously saved information. If the AMF cannot make this determination, the AMF may send the Network Slice Selection Request message to the NSSF 320 and, if necessary, repeats this procedure.

According to a detailed embodiment of the present disclosure, the AMF may save the allowed NSSAI received from the NSSF and available area information associated with the allowed NSSAI for use by other users afterward. It is advantageous for the AMF to save this information for reuse because this information is configured per service in a mobile communication network rather than per UE. It may be possible for the AMF to use a timer to verify the validity of the NSSAI and corresponding service available areas information received from the NSSF until the timer expires.

The timer may be an internal setting value of the AMF or may be set to a value transmitted by the NSSF in response to the Network Slice Selection Request message. If the network slice-related policy or the available area is changed, the NSSF may send the AMF a notification message to trigger update of the corresponding information. Then, the AMF may send the NSSF the Network Slice Selection Request message again.

Upon receipt of the Registration Accept message, the UE 300 sets the value received from the AMF 310 internally to complete the registration procedure and sends the AMF 310 a Registration Complete message at step S306. The UE 300 may determine the network slices available in the allocated registration area based on the information transmitted by the AMF 310 and notice that only these network slices are available in a specific region. Accordingly, the UE 300 uses only the network slices available in the corresponding regions of the registration area allocated by the AMF.

Although the UE may send the Registration Request message to the AMF, whenever the UE wants to request authorization for use of another network slice, if the UE knows that the target network slice is unavailable in the current registration area, the UE may not make a request for the corresponding network slice. If the UE moves out of the registration area allocated by the AMF, the UE may send the Registration Request message again and, in this case, the request may be made for use of a network slice that is not available in the old registration area; for this purpose, the requested NSSAI includes the corresponding network slice.

FIG. 3B is a signal flow diagram illustrating a procedure in which an AMF sends information on a network slice requested by a UE and a current location of the UE to a policy control function (PCF) and, in reply, the PCF sends information on network slices available for use by the UE and areas supporting the network slices to the AMF.

At step S3001, the UE 301 sends a Registration Request message to an AMF 311 to connect to the network. The AMF 311 initiates a procedure for selecting a network slice available for the UE 301 based on the requested NSSAI included in the Registration Request message.

In order to perform the network slice selection procedure, the AMF 311 sends an NSSF 321 a Network Slice Selection Request message at step S3002. This message is not limited by its name, and it may be any of all messages intended to acquire network slice-related information from the NS SF 321.

The Network Slice Select Request message may include the UE ID and the requested NS SAI sent by the UE 301. The AMF 311 may send the requested NS SAI received from the UE 301 to the NSSF 321 without any modification, or the AMF 311 may transmit a query to a UDM (subscriber information storage device) to acquire subscribed NSSAI available for the UE 301, compare the acquire NS SAI and the requested NS SAI transmitted by the UE, send the NS SF 321 the intersection of the NSSAI as an extracted requested NSSAI.

The NSSF 321 determines whether the requested NSSAI is available for use by the UE 301 based on the Network Slice Select Request message and then determines NSSAI available for use by the UE 301. The NSSF 321 sends, at step S3003, the NSSAI determined as above to the AMF 311.

According to an embodiment of the present disclosure, the AMF 311 sends, at step S3004, a PCF 341 a Policy Update Request message for updating a policy of the UE 301. The PCF 341 derives the information on the areas where the NSSAI allowed for use by the UE 301 is available from the received information.

According to an embodiment of the present disclosure, the PCF 341 derives the information on the area where the NSSAI determined for use by the UE 301 is available. In the present disclosure, this area is referred to as Network Slice Available Area for convenience of explanation.

According to a detailed embodiment of the present disclosure, the area information may be set to "All PLMN" to indicate that the UE can use the NSSAI in the entire area of the PLMN to which the UE is connected. According to a detailed embodiment, the PCF 341 may set the area information to Network Slice Available Area. For example, if the access location of the UE 301 is Seoul and if the network slice requested by the UE 301 is available only in Seoul, the PCF 341 may configure the area information to indicate Seoul or a registration area list covering Seoul. After determining the network slice available area for the network slice for the UE as above, the PCF 341 sends a response message to the AMF 311.

At step S3005, the PCF 341 sends the AMF 311 a Policy Update Response message including the above information in response to the Policy Update Request message.

The PCF 341 may also receive the network slice available area information from an OAM 331 as a PLMN management device. The OAM 331 as a device for a network operator to manage the network makes it possible for the network operator to determine and configure the serving areas and networks slices for supporting the services. The PCF 341 may receive and save, in advance, the network slice available area information and the NSSAI that the OAM 301 has configured or inquire to the OAM 331 about the network slice available area information and NSSAI upon receipt of the network slice select request message transmitted by the AMF 311.

At step S3006, the AMF 311 allocates a registration area to the UE 301 after receiving the NSSAI allowed for use by the UE 301 from the NSSF 321 and the network slice available area information from the PCF 341. According to an embodiment of the present disclosure, the AMF 311 checks for the network slice available area and determines the network slices available in the TA (basic unit of UE location management) indicated by a TAI to map the NSSAI to the TAI for allocating a registration area to the UE 301.

For example, if the TA identified by TAI 1 supports NSSAI 1 and NSSAI 2, the AMF 311 maps the NSSAI 1 and NSSAI 2 to TAI 1 for allocating a registration area to the UE 301. If TA identified by TAI 2 supports NSSAI 1, the AMF 311 maps NSSAI 1 to TAI 1 and sends the mapping to the UE 301. It may also be possible to generate a TAI list for NSSAI 1 and a TAI list for NSSAI 2 and designate a registration area list per NSSAI.

According to a detailed embodiment, the AMF 311 may derive the registration area to be allocated to the UE 301 from an intersection of a service restriction area of the UE 301 and the network slice available area received from the NSSF 321 and allocate part or all of the intersection to the UE 301 according to the mobility characteristic of the UE 301.

At step S3007, the AMF 311 sends the UE 301 a Registration Accept message including the allocated registration area and available NSSAI.

Figure 3C:
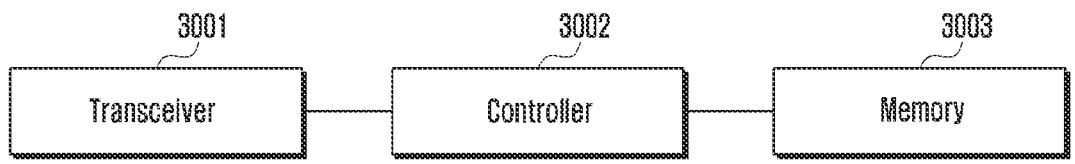
FIG. 3C is a block diagram illustrating a configuration of a UE according to an embodiment of the present disclosure.
Figure 3D:
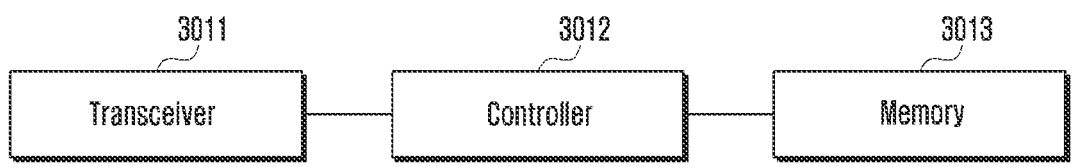
FIG. 3D is a block diagram illustrating a configuration of an AMF according to an embodiment of the present disclosure.
Figure 3E:
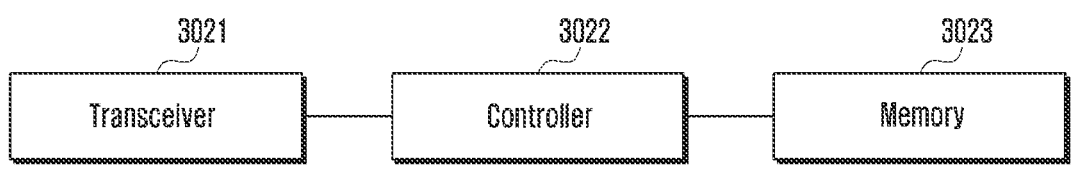
FIG. 3E is a block diagram illustrating a configuration of an NSSF according to an embodiment of the present disclosure.

FIG. 3C is a block diagram illustrating a configuration of a UE according to an embodiment of the present disclosure, FIG. 3D is a block diagram illustrating a configuration of an AMF according to an embodiment of the present disclosure, and FIG. 3E is a block diagram illustrating a configuration of an NSSF according to an embodiment of the present disclosure.

As shown in FIG. 3C, the UE may include a transceiver 3001, a controller 3002, and a memory 3003.

According to an embodiment of the present disclosure, the transceiver 3001 of the UE communicates at least one message with a base station and at least one other UE over wireless links to accomplish an operation according to an embodiment of the present disclosure. For example, the transceiver 3001 may transmit a Registration Request message to the eNB to register the UE with the eNB.

The controller 3002 of the UE may control the transceiver 3001 and the memory 3003 to perform a UE operation according to an embodiment of the present disclosure. According to an embodiment of the present disclosure, the controller 3002 of the UE may control the transceiver 3001 to transmit a registration request message to the eNB and receive a registration response message from the base station.

As shown in FIG. 3D, the AMF may include a transceiver 3011, a controller 3012, and a memory 3013.

In detail, the transceiver 3011 of the AMF may communicate with an eNB and an NSSF to accomplish an operation according to an embodiment of the present disclosure. For example, the transceiver 3011 of the AMF may receive a message transmitted from an eNB to a UE and send a network slice selection request message to an NSSF.

The controller 3012 of the AMF may control the transceiver 3011 and the memory 3013 to accomplish an operation of the AMF according to an embodiment of the present disclosure. For example, the controller 3012 of the AMF may compare NSSAI requested by the UE and NSSAI received from a UDM in association with the UE and allocate a registration area to the UE based on the NSSAI and area information acquired from the NSSF.

As shown in FIG. 3E, the NSSF may include a transceiver 3021, a controller 3022, and a memory 3023.

In detail, the transceiver 3021 of the NSSF may receive NSSAI requested by the UE from an AMF to accomplish an operation according to an embodiment of the present disclosure. The transceiver 3021 may also receive information on serving areas related to the NSSAI requested by the UE.

The controller 3022 of the NSSF may control the transceiver 3021 and the memory 3023 to accomplish an operation of the NSSF according to an embodiment of the present disclosure. For example, the controller 3022 of the NSSF may select NSSAI allowed according to the location information of the UE based on the NSSAI requested by the UE. The controller 3022 may also control the transceiver 3021 to transmit the allowed NSSAI and information on available serving areas related to the allowed NSSAI to the AMF.

As described above, the present disclosure is advantageous in terms of facilitating a 5G core network (CN) registration procedure using multiple UE temporary identifiers (IDs).

Also, the preset disclosure is advantageous in that a remote UE is capable of using radio resources with efficient power consumption by applying a UE-specific DRX cycle, active state sojourn time before entering PSM (i.e., active timer), or connection keep-alive time (inactivity timer) configured by a base station or a CN to the PC5 link without necessity of maintaining the PC5 link or performing a keep-alive operation frequently over the PC5 link unnecessarily. This can be achieved by reflecting the communication pattern for use by the remote UE being served by the network to the PC5 link established with the relay UE in the same manner.

Likewise, the relay UE is capable of establishing a PC5 link with the remote UE or checking the PC5 link when necessary based on a cycle or timer configured by the network without necessity of maintaining the PC5 link with the remote UE or performing a keep-alive operation frequently over the PC5 link unnecessarily.

Also, the present disclosure is advantageous in that a 5G CN is capable of acquiring information on network slice-specific areas available for a UE and assigning a registration area for managing the terminal based on the area information. As a consequence, the UE is capable of distinguishing between available network slices and unavailable network slices in its assigned network area.

The embodiments disclosed in the specification and drawings are proposed to help explain and understand the present disclosure rather than to limit the scope of the present disclosure. It is therefore intended that the following claims be interpreted to include all alterations and modification made to the disclosed embodiments as fall within the spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an access and mobility management function (AMF) in a wireless communication system, the method comprising:
receiving, from a terminal, a first message including requested network slice selection assistance information (NSSAI);
transmitting, to a network slice selection function (NSSF), a second message including the requested NSSAI and information on a tracking area of the terminal based on the first message;
receiving, from the NSSF, a third message as a response to the second message, the third message including allowed NSSAI for the terminal and information for at least one AMF to be used to serve the terminal;
identifying that rerouting to a target AMF is unnecessary based on the third message; and
based on identifying that the rerouting to the target AMF is unnecessary:
determining a registration area for the terminal based on the allowed NSSAI, wherein the allowed NSSAI is available in the registration area; and
transmitting, to the terminal, a fourth message including the allowed NSSAI and the registration area for the terminal.

2. The method of claim 1, wherein the registration area is determined such that all network slices of the allowed NSSAI are available in all tracking areas within the registration area.

3. The method of claim 1, wherein the information for the at least one AMF comprises information on a target AMF set, or information on a list of at least one AMF identifier (ID).

4. The method of claim 1, wherein the requested NSSAI is used to determine the allowed NSSAI.

5. The method of claim 1, further comprising:
receiving, from a unified data management (UDM), a message including a subscribed NSSAI for the terminal.

6. An access and mobility management function (AMF) in a wireless communication system, the AMF comprising:
a transceiver; and
a controller configured to:
receive, from a terminal via the transceiver, a first message including requested network slice selection assistance information (NSSAI),
transmit, to a network slice selection function (NSSF) via the transceiver, a second message including the requested NSSAI and information on a tracking area of the terminal based on the first message,
receive, from the NSSF via the transceiver, a third message as a response to the second message, the third message including allowed NSSAI for the terminal and information for at least one AMF to be used to serve the terminal, identify whether rerouting to another AMF is necessary based on the third message,
in case that it is identified that rerouting to another AMF is necessary, perform an AMF relocation procedure, and
in case that it is identified that rerouting to another AMF is unnecessary:
determine a registration area for the terminal based on the allowed NSSAI, wherein the allowed NSSAI is available in the registration area, and
transmit, to the terminal via the transceiver, a fourth message including the allowed NSSAI and the registration area for the terminal.

7. The AMF of claim 6, wherein the registration area is determined such that all network slices of the allowed NSSAI are available in all tracking areas within the registration area.

8. The AMF of claim 6, wherein the information for the at least one AMF comprises information on a target AMF set, or information on a list of at least one AMF identifier (ID).

9. The AMF of claim 6, wherein the requested NSSAI is used to determine the allowed NSSAI.

10. The AMF of claim 6, wherein the controller is further configured to receive, from a unified data management (UDM), a message including a subscribed NSSAI for the terminal.

\* \* \* \* \*